(12) United States Patent
Dueweke et al.

(10) Patent No.: US 6,806,997 B1
(45) Date of Patent: Oct. 19, 2004

(54) PATTERNED DIFFRACTIVE LIGHT MODULATOR RIBBON FOR PDL REDUCTION

(75) Inventors: Michael Dueweke, Santa Clara, CA (US); Dinesh Maheshwari, Fremont, CA (US); Christopher Gudernan, Los Gatos, CA (US); Jahja I. Trisnadi, Cupertino, CA (US)

(73) Assignee: Silicon Light Machines, Inc., Sunnyvale, CA (US)

( * ) Notice: Subject to any disclaimer, the term of this patent is extended or adjusted under 35 U.S.C. 154(b) by 0 days.

(21) Appl. No.: 10/377,912

(22) Filed: Feb. 28, 2003

(51) Int. Cl.[7] ............................ G02B 26/08; G02F 1/29
(52) U.S. Cl. ...................................... 359/302; 359/563
(58) Field of Search ............................... 359/237, 298, 359/302, 563, 318, 569, 567, 558, 209–9, 571, 573–6, 270, 223–4; 345/85

(56) References Cited

U.S. PATENT DOCUMENTS

| | | |
|---|---|---|
| 1,525,550 A | 2/1925 | Jenkins |
| 1,548,262 A | 8/1925 | Freedman |
| RE16,767 E | 10/1927 | Jenkins ......................... 359/291 |
| 1,814,701 A | 7/1931 | Ives |
| 2,415,226 A | 2/1947 | Sziklai ......................... 178/5.4 |
| 2,783,406 A | 2/1957 | Vanderhooft ................. 313/70 |
| 2,920,529 A | 1/1960 | Blythe ............................ 88/73 |
| 2,991,690 A | 7/1961 | Grey et al. ................... 88/16.6 |
| RE25,169 E | 5/1962 | Glenn .......................... 348/764 |
| 3,256,465 A | 6/1966 | Weissenstern et al. ...... 317/101 |
| 3,388,301 A | 6/1968 | James .......................... 317/234 |
| 3,443,871 A | 5/1969 | Chitayat ...................... 356/106 |
| 3,553,364 A | 1/1971 | Lee .............................. 178/7.3 |
| 3,576,394 A | 4/1971 | Lee .............................. 178/7.3 |
| 3,600,798 A | 8/1971 | Lee .............................. 29/592 |
| 3,656,837 A | 4/1972 | Sandbank .................... 350/161 |
| 3,657,610 A | 4/1972 | Yamamoto et al. ......... 317/243 |
| 3,693,239 A | 9/1972 | Dix .............................. 29/470 |
| 3,743,507 A | 7/1973 | Ih et al. .......................... 96/81 |
| 3,752,563 A | 8/1973 | Torok et al. ................. 350/151 |
| 3,781,465 A | 12/1973 | Ernstoff et al. ......... 178/5.4 BD |
| 3,783,184 A | 1/1974 | Ernstoff et al. ......... 178/5.4 BD |
| 3,792,916 A | 2/1974 | Sarna ......................... 350/163 |
| 3,802,769 A | 4/1974 | Rotz et al. ..................... 352/43 |
| 3,811,186 A | 5/1974 | Larnerd et al. ............... 29/626 |
| 3,861,784 A | 1/1975 | Torok ..................... 350/162 R |
| 3,862,360 A | 1/1975 | Dill et al. ................. 178/7.3 D |
| 3,871,014 A | 3/1975 | King et al. .................... 357/67 |
| 3,886,310 A | 5/1975 | Guldberg et al. ........ 178/7.5 D |
| 3,896,338 A | 7/1975 | Nathanson et al. ......... 315/373 |
| 3,915,548 A | 10/1975 | Opittek ........................ 350/3.5 |

(List continued on next page.)

FOREIGN PATENT DOCUMENTS

| | | | |
|---|---|---|---|
| DE | 32 33 195 A1 | 3/1983 | .......... H01L/23/52 |
| DE | 43 23 799 A1 | 1/1994 | .......... H01L/23/50 |
| DE | 197 23 618 A1 | 12/1997 | ............. G03F/1/14 |
| DE | 197 51 716 A1 | 5/1998 | .......... G02B/27/14 |
| DE | 198 46 532 C1 | 5/2000 | .......... G02B/27/09 |
| EP | 0 089 044 A2 | 9/1983 | .......... H01L/23/10 |

(List continued on next page.)

*Primary Examiner*—Jordan M. Schwartz
*Assistant Examiner*—Jessica Stultz
(74) *Attorney, Agent, or Firm*—Okamoto & Benedicto LLP (57) ABSTRACT

A modulator for modulating an incident beam of light. The modulator includes a plurality of elements, each element including a first end, a second end, a first linear side, a second linear side, and a continuous or non-continuous light reflective planar surface plurality of elements are arranged parallel to each other and further wherein the light reflective planar surface of each of the plurality of elements includes a first non-linear side and a second non-linear side. The modulator also includes a support structure coupled to each end of the plurality of elements to enable movement between a first modulator configuration wherein the plurality of elements act to reflect the incident beam of light as a plane mirror, and a second modulator configuration wherein the plurality of elements act to diffract the incident beam of light.

20 Claims, 8 Drawing Sheets

U.S. PATENT DOCUMENTS

| | | |
|---|---|---|
| 3,935,499 A | 1/1976 | Oess .......................... 313/413 |
| 3,935,500 A | 1/1976 | Oess et al. ................. 313/495 |
| 3,938,881 A | 2/1976 | Biegelsen et al. .......... 350/161 |
| 3,941,456 A | 3/1976 | Schilz et al. ................ 350/161 |
| 3,942,245 A | 3/1976 | Jackson et al. ............... 29/591 |
| 3,943,281 A | 3/1976 | Keller et al. ............. 178/7.5 D |
| 3,947,105 A | 3/1976 | Smith ........................ 353/121 |
| 3,969,611 A | 7/1976 | Fonteneau .................. 219/502 |
| 3,980,476 A | 9/1976 | Wysocki ...................... 96/1.1 |
| 3,991,416 A | 11/1976 | Byles et al. ............. 340/324 R |
| 4,001,663 A | 1/1977 | Bray ............................ 321/2 |
| 4,004,849 A | 1/1977 | Shattuck ................ 350/160 R |
| 4,006,968 A | 2/1977 | Ernstoff et al. ....... 350/160 LC |
| 4,009,939 A | 3/1977 | Okano ................. 350/162 SF |
| 4,011,009 A | 3/1977 | Lama et al. ............ 350/162 R |
| 4,012,116 A | 3/1977 | Yevick ....................... 350/132 |
| 4,012,835 A | 3/1977 | Wallick ....................... 29/591 |
| 4,017,158 A | 4/1977 | Booth .................. 350/162 SF |
| 4,020,381 A | 4/1977 | Oess et al. .................. 313/302 |
| 4,021,766 A | 5/1977 | Aine ............................ 338/2 |
| 4,034,211 A | 7/1977 | Horst et al. .......... 235/61.12 N |
| 4,034,399 A | 7/1977 | Drukier et al. ............... 357/68 |
| 4,035,068 A | 7/1977 | Rawson ..................... 353/122 |
| 4,067,129 A | 1/1978 | Abramson et al. ............ 40/563 |
| 4,084,437 A | 4/1978 | Finnegan ..................... 73/361 |
| 4,090,219 A | 5/1978 | Ernstoff et al. ............... 358/59 |
| 4,093,346 A | 6/1978 | Nishino et al. ........ 350/162 SF |
| 4,093,921 A | 6/1978 | Buss .......................... 325/459 |
| 4,093,922 A | 6/1978 | Buss .......................... 325/459 |
| 4,100,579 A | 7/1978 | Ernstoff ..................... 358/230 |
| 4,103,273 A | 7/1978 | Keller .......................... 338/2 |
| 4,126,380 A | 11/1978 | Borm ......................... 350/266 |
| 4,127,322 A | 11/1978 | Jacobson et al. ............. 353/31 |
| 4,135,502 A | 1/1979 | Peck ....................... 128/76.5 |
| 4,139,257 A | 2/1979 | Matsumoto ................. 350/6.1 |
| 4,143,943 A | 3/1979 | Rawson ..................... 350/120 |
| 4,163,570 A | 8/1979 | Greenaway ................ 283/8 A |
| 4,184,700 A | 1/1980 | Greenaway ..................... 283/6 |
| 4,185,891 A | 1/1980 | Kaestner ..................... 350/167 |
| 4,190,855 A | 2/1980 | Inoue .......................... 357/80 |
| 4,195,915 A | 4/1980 | Lichty et al. ................ 350/345 |
| 4,205,428 A | 6/1980 | Ernstoff et al. ........... 29/592 R |
| 4,211,918 A | 7/1980 | Nyfeler et al. .............. 235/454 |
| 4,223,050 A | 9/1980 | Nyfeler et al. .............. 427/163 |
| 4,225,913 A | 9/1980 | Bray .......................... 363/97 |
| 4,249,796 A | 2/1981 | Sincerbox et al. .......... 350/370 |
| 4,250,217 A | 2/1981 | Greenaway ................ 428/161 |
| 4,250,393 A | 2/1981 | Greenaway ................ 250/566 |
| 4,256,787 A | 3/1981 | Shaver et al. .................. 428/1 |
| 4,257,016 A | 3/1981 | Kramer, Jr. et al. ........ 322/7.51 |
| 4,290,672 A | 9/1981 | Whitefield ................. 350/358 |
| 4,295,145 A | 10/1981 | Latta .......................... 346/108 |
| 4,311,999 A | 1/1982 | Upton et al. ................ 340/755 |
| 4,327,411 A | 4/1982 | Turner ....................... 364/900 |
| 4,327,966 A | 5/1982 | Bloom .................. 350/162 R |
| 4,331,972 A | 5/1982 | Rajchman ................... 358/60 |
| 4,336,982 A | 6/1982 | Rector, Jr. .................. 350/358 |
| 4,338,660 A | 7/1982 | Kelley et al. ............... 364/200 |
| 4,343,535 A | 8/1982 | Bleha, Jr. ................... 350/342 |
| 4,346,965 A | 8/1982 | Sprague et al. ............. 350/358 |
| 4,348,079 A | 9/1982 | Johnson ..................... 350/358 |
| 4,355,463 A | 10/1982 | Burns ......................... 29/827 |
| 4,361,384 A | 11/1982 | Bosserman ................. 350/174 |
| 4,369,524 A | 1/1983 | Rawson et al. ............. 455/606 |
| 4,374,397 A | 2/1983 | Mir ............................ 358/75 |
| 4,389,096 A | 6/1983 | Hori et al. ............. 350/339 R |
| 4,391,490 A | 7/1983 | Hartke ....................... 350/356 |
| 4,396,246 A | 8/1983 | Holman .................. 350/96.14 |
| 4,398,798 A | 8/1983 | Krawczak et al. ..... 350/162.24 |
| 4,400,740 A | 8/1983 | Traino et al. ............... 358/293 |
| 4,408,884 A | 10/1983 | Kleinknecht et al. ........ 356/355 |
| 4,414,583 A | 11/1983 | Hooker, III ................. 358/300 |
| 4,417,386 A | 11/1983 | Exner .......................... 29/590 |
| 4,418,397 A | 11/1983 | Brantingham et al. ....... 364/900 |
| 4,420,717 A | 12/1983 | Wallace et al. ............. 318/696 |
| 4,422,099 A | 12/1983 | Wolfe ........................ 358/293 |
| 4,426,768 A | 1/1984 | Black et al. ................. 29/583 |
| 4,430,584 A | 2/1984 | Someshwar et al. ........ 307/465 |
| 4,435,041 A | 3/1984 | Torok et al. ............ 350/162.24 |
| 4,440,839 A | 4/1984 | Mottier ........................ 430/2 |
| 4,443,819 A | 4/1984 | Funada et al. .............. 358/236 |
| 4,443,845 A | 4/1984 | Hamilton et al. ........... 364/200 |
| 4,447,881 A | 5/1984 | Brantingham et al. ....... 364/488 |
| 4,454,591 A | 6/1984 | Lou ........................... 364/900 |
| 4,456,338 A | 6/1984 | Gelbart ...................... 350/358 |
| 4,460,907 A | 7/1984 | Nelson .................... 346/153.1 |
| 4,462,046 A | 7/1984 | Spight ....................... 358/101 |
| 4,467,342 A | 8/1984 | Tower ......................... 357/30 |
| 4,468,725 A | 8/1984 | Venturini .................... 363/160 |
| 4,483,596 A | 11/1984 | Marshall .................... 350/385 |
| 4,484,188 A | 11/1984 | Ott ............................ 340/728 |
| 4,487,677 A | 12/1984 | Murphy ..................... 204/247 |
| 4,492,435 A | 1/1985 | Banton et al. .............. 350/360 |
| 4,503,494 A | 3/1985 | Hamilton et al. ........... 364/200 |
| 4,511,220 A | 4/1985 | Scully ........................ 350/403 |
| 4,538,883 A | 9/1985 | Sprague et al. ............. 350/356 |
| 4,545,610 A | 10/1985 | Lakritz et al. ................ 29/589 |
| 4,556,378 A | 12/1985 | Nyfeler et al. .............. 425/143 |
| 4,558,171 A | 12/1985 | Gantley et al. .......... 174/52 FP |
| 4,561,044 A | 12/1985 | Ogura et al. ................. 362/84 |
| 4,566,935 A | 1/1986 | Hornbeck ................... 156/626 |
| 4,567,585 A | 1/1986 | Gelbart ........................ 369/97 |
| 4,571,041 A | 2/1986 | Gaudyn ...................... 353/10 |
| 4,571,603 A | 2/1986 | Hornbeck et al. .......... 346/160 |
| 4,577,932 A | 3/1986 | Gelbart ...................... 350/358 |
| 4,577,933 A | 3/1986 | Yip et al. .................... 350/358 |
| 4,588,957 A | 5/1986 | Balant et al. ................ 330/4.3 |
| 4,590,548 A | 5/1986 | Maytum ..................... 363/161 |
| 4,594,501 A | 6/1986 | Culley et al. ............... 219/492 |
| 4,596,992 A | 6/1986 | Hornbeck ............... 346/76 PH |
| 4,615,595 A | 10/1986 | Hornbeck ................... 353/122 |
| 4,623,219 A | 11/1986 | Trias ......................... 350/351 |
| 4,636,039 A | 1/1987 | Turner ....................... 350/356 |
| 4,636,866 A | 1/1987 | Hattori ....................... 358/236 |
| 4,641,193 A | 2/1987 | Glenn ........................ 358/233 |
| 4,645,881 A | 2/1987 | LeToumelin et al. ........ 379/252 |
| 4,646,158 A | 2/1987 | Ohno et al. ................. 358/236 |
| 4,649,085 A | 3/1987 | Landram .................... 428/620 |
| 4,649,432 A | 3/1987 | Watanabe ................... 358/241 |
| 4,652,932 A | 3/1987 | Miyajima et al. ........... 358/236 |
| 4,655,539 A | 4/1987 | Caulfield et al. ............ 350/3.6 |
| 4,660,938 A | 4/1987 | Kazan ........................ 350/355 |
| 4,661,828 A | 4/1987 | Miller, Jr. et al. .......... 346/108 |
| 4,662,746 A | 5/1987 | Hornbeck ................... 350/269 |
| 4,663,670 A | 5/1987 | Ito et al. ..................... 358/245 |
| 4,687,326 A | 8/1987 | Corby, Jr. ...................... 356/5 |
| 4,698,602 A | 10/1987 | Armitage ................... 332/7.51 |
| 4,700,276 A | 10/1987 | Freyman et al. ............. 361/403 |
| 4,707,064 A | 11/1987 | Dobrowolski et al. ... 350/96.19 |
| 4,709,995 A | 12/1987 | Kuribayashi et al. ....... 350/350 |
| 4,710,732 A | 12/1987 | Hornbeck .................. 332/7.51 |
| 4,711,526 A | 12/1987 | Hennings et al. ........... 350/170 |
| 4,714,326 A | 12/1987 | Usui et al. .................. 350/485 |
| 4,717,066 A | 1/1988 | Goldenberg et al. ........ 228/179 |
| 4,719,507 A | 1/1988 | Bos ............................. 358/92 |
| 4,721,629 A | 1/1988 | Sakai et al. ................... 427/35 |
| 4,722,593 A | 2/1988 | Shimazaki .................. 350/336 |
| 4,724,467 A | 2/1988 | Yip et al. ...................... 355/71 |
| 4,728,185 A | 3/1988 | Thomas ..................... 353/122 |
| 4,743,091 A | 5/1988 | Gelbart ...................... 350/252 |
| 4,744,633 A | 5/1988 | Sheiman .................... 350/132 |

| | | | |
|---|---|---|---|
| 4,747,671 A | 5/1988 | Takahashi et al. ............ 350/336 |
| 4,751,509 A | 6/1988 | Kubota et al. ................ 340/784 |
| 4,761,253 A | 8/1988 | Antes ............................ 264/1.3 |
| 4,763,975 A | 8/1988 | Scifres et al. .............. 350/96.15 |
| 4,765,865 A | 8/1988 | Gealer et al. ................ 156/647 |
| 4,772,094 A | 9/1988 | Sheiman ...................... 350/133 |
| 4,797,694 A | 1/1989 | Agostinelli et al. .......... 346/160 |
| 4,797,918 A | 1/1989 | Lee et al. ...................... 380/20 |
| 4,801,194 A | 1/1989 | Agostinelli et al. .......... 350/356 |
| 4,803,560 A | 2/1989 | Matsunaga et al. .......... 359/236 |
| 4,804,641 A | 2/1989 | Arlt et al. .................... 437/227 |
| 4,807,021 A | 2/1989 | Okumura ....................... 357/75 |
| 4,807,965 A | 2/1989 | Garakani ..................... 350/131 |
| 4,809,078 A | 2/1989 | Yabe et al. ................... 358/236 |
| 4,811,082 A | 3/1989 | Jacobs et al. ................. 357/80 |
| 4,811,210 A | 3/1989 | McAulay ...................... 364/200 |
| 4,814,759 A | 3/1989 | Gombrich et al. .......... 340/771 |
| 4,817,850 A | 4/1989 | Wiener-Avnear et al. ... 228/119 |
| 4,824,200 A | 4/1989 | Isono et al. ................ 350/96.16 |
| 4,827,391 A | 5/1989 | Sills .............................. 363/41 |
| 4,829,365 A | 5/1989 | Eichenlaub ..................... 358/3 |
| 4,836,649 A | 6/1989 | Ledebuhr et al. ........ 350/331 R |
| 4,856,863 A | 8/1989 | Sampsell et al. .......... 350/96.16 |
| 4,856,869 A | 8/1989 | Sakata et al. ........... 350/162.18 |
| 4,859,012 A | 8/1989 | Cohn ........................ 350/96.24 |
| 4,859,060 A | 8/1989 | Katagiri et al. .............. 356/352 |
| 4,866,488 A | 9/1989 | Frensley .......................... 357/4 |
| 4,882,683 A | 11/1989 | Rupp et al. .................. 364/521 |
| 4,893,509 A | 1/1990 | MacIver et al. ......... 73/517 AV |
| 4,896,325 A | 1/1990 | Coldren ......................... 372/20 |
| 4,896,948 A | 1/1990 | Dono et al. .................. 350/355 |
| 4,897,708 A | 1/1990 | Clements ....................... 357/65 |
| 4,902,083 A | 2/1990 | Wells .......................... 350/6.6 |
| 4,915,463 A | 4/1990 | Barbee, Jr. .................... 350/1.1 |
| 4,915,479 A | 4/1990 | Clarke ......................... 350/345 |
| 4,924,413 A | 5/1990 | Suwannukul ................ 364/521 |
| 4,926,241 A | 5/1990 | Carey ........................... 357/75 |
| 4,930,043 A | 5/1990 | Wiegand ..................... 361/283 |
| 4,934,773 A | 6/1990 | Becker ......................... 350/6.6 |
| 4,940,309 A | 7/1990 | Baum .......................... 350/171 |
| 4,943,815 A | 7/1990 | Aldrich et al. .............. 346/108 |
| 4,945,773 A | 8/1990 | Sickafus .................... 73/862.59 |
| 4,949,148 A | 8/1990 | Bartelink ....................... 357/74 |
| 4,950,890 A | 8/1990 | Gelbart .................. 250/237 G |
| 4,952,925 A | 8/1990 | Haastert ...................... 340/784 |
| 4,954,789 A | 9/1990 | Sampsell ....................... 330/4.3 |
| 4,956,619 A | 9/1990 | Hornbeck .................... 330/4.3 |
| 4,961,633 A | 10/1990 | Ibrahim et al. .............. 350/392 |
| 4,963,012 A | 10/1990 | Tracy et al. ................. 350/641 |
| 4,970,575 A | 11/1990 | Soga et al. ..................... 357/72 |
| 4,978,202 A | 12/1990 | Yang ...................... 350/331 R |
| 4,982,184 A | 1/1991 | Kirkwood ................... 340/783 |
| 4,982,265 A | 1/1991 | Watanabe et al. ............. 357/75 |
| 4,984,824 A | 1/1991 | Antes et al. ................. 283/91 |
| 4,999,308 A | 3/1991 | Nishiura et al. ................ 437/4 |
| 5,003,300 A | 3/1991 | Wells .......................... 340/705 |
| 5,009,473 A | 4/1991 | Hunter et al. ................. 350/6.6 |
| 5,013,141 A | 5/1991 | Sakata ......................... 350/348 |
| 5,018,256 A | 5/1991 | Hornbeck ................. 29/25.01 |
| 5,022,750 A | 6/1991 | Flasck .......................... 353/31 |
| 5,023,905 A | 6/1991 | Wells et al. ................... 379/96 |
| 5,024,494 A | 6/1991 | Williams et al. .............. 350/3.6 |
| 5,028,939 A | 7/1991 | Hornbeck et al. ........... 346/160 |
| 5,035,473 A | 7/1991 | Kuwayama et al. .......... 350/3.7 |
| 5,037,173 A | 8/1991 | Sampsell et al. ............. 385/17 |
| 5,039,628 A | 8/1991 | Carey ......................... 437/183 |
| 5,040,052 A | 8/1991 | McDavid ...................... 357/80 |
| 5,041,395 A | 8/1991 | Steffen ....................... 437/206 |
| 5,041,851 A | 8/1991 | Nelson ....................... 346/160 |
| 5,043,917 A | 8/1991 | Okamoto .................... 364/518 |
| 5,048,077 A | 9/1991 | Wells et al. ................... 379/96 |
| 5,049,901 A | 9/1991 | Gelbart ....................... 346/108 |
| 5,058,992 A | 10/1991 | Takahashi ................... 359/567 |
| 5,060,058 A | 10/1991 | Goldenberg et al. ........... 358/60 |
| 5,061,049 A | 10/1991 | Hornbeck ................... 359/224 |
| 5,066,614 A | 11/1991 | Dunaway et al. ............ 437/209 |
| 5,068,205 A | 11/1991 | Baxter et al. ................ 437/205 |
| 5,072,239 A | 12/1991 | Mitcham et al. ............ 346/108 |
| 5,072,418 A | 12/1991 | Boutaud et al. ........ 364/715.06 |
| 5,074,947 A | 12/1991 | Estes et al. ............... 156/307.3 |
| 5,075,940 A | 12/1991 | Kuriyama et al. ......... 29/25.03 |
| 5,079,544 A | 1/1992 | DeMond et al. ............ 340/701 |
| 5,081,617 A | 1/1992 | Gelbart ....................... 369/112 |
| 5,083,857 A | 1/1992 | Hornbeck ................... 359/291 |
| 5,085,497 A | 2/1992 | Um et al. .................... 359/848 |
| 5,089,903 A | 2/1992 | Kuwayama et al. .......... 359/15 |
| 5,093,281 A | 3/1992 | Eshima ....................... 437/217 |
| 5,096,279 A | 3/1992 | Hornbeck et al. ........... 359/230 |
| 5,099,353 A | 3/1992 | Hornbeck ................... 359/291 |
| 5,101,184 A | 3/1992 | Antes ......................... 235/454 |
| 5,101,236 A | 3/1992 | Nelson et al. ............... 355/229 |
| 5,103,334 A | 4/1992 | Swanberg .................... 359/197 |
| 5,105,207 A | 4/1992 | Nelson ....................... 346/160 |
| 5,105,299 A | 4/1992 | Anderson et al. ........... 359/223 |
| 5,105,369 A | 4/1992 | Nelson ....................... 364/525 |
| 5,107,372 A | 4/1992 | Gelbart et al. .............. 359/824 |
| 5,112,436 A | 5/1992 | Bol .............................. 156/643 |
| 5,113,272 A | 5/1992 | Reamey ........................ 359/53 |
| 5,113,285 A | 5/1992 | Franklin et al. ............. 359/465 |
| 5,115,344 A | 5/1992 | Jaskie ......................... 359/573 |
| 5,119,204 A | 6/1992 | Hashimoto et al. ......... 358/254 |
| 5,121,343 A | 6/1992 | Faris ........................... 395/111 |
| 5,126,812 A | 6/1992 | Greiff ........................... 357/25 |
| 5,126,826 A | 6/1992 | Kauchi et al. ................. 357/72 |
| 5,126,836 A | 6/1992 | Um .............................. 358/60 |
| 5,128,660 A | 7/1992 | DeMond et al. ............ 340/707 |
| 5,129,716 A | 7/1992 | Holakovszky et al. ........ 351/50 |
| 5,132,723 A | 7/1992 | Gelbart ......................... 355/40 |
| 5,132,812 A | 7/1992 | Takahashi et al. .............. 359/9 |
| 5,136,695 A | 8/1992 | Goldshlag et al. ........... 395/275 |
| 5,137,836 A | 8/1992 | Lam .............................. 437/8 |
| 5,142,303 A | 8/1992 | Nelson ....................... 346/108 |
| 5,142,405 A | 8/1992 | Hornbeck ................... 359/226 |
| 5,142,677 A | 8/1992 | Ehlig et al. ................. 395/650 |
| 5,144,472 A | 9/1992 | Sang, Jr. et al. ............. 359/254 |
| 5,147,815 A | 9/1992 | Casto ........................... 437/51 |
| 5,148,157 A | 9/1992 | Florence ..................... 340/783 |
| 5,148,506 A | 9/1992 | McDonald .................... 385/16 |
| 5,149,405 A | 9/1992 | Bruns et al. .............. 204/129.1 |
| 5,150,205 A | 9/1992 | Um et al. ...................... 358/60 |
| 5,151,718 A | 9/1992 | Nelson ....................... 346/160 |
| 5,151,724 A | 9/1992 | Kikinis ......................... 357/17 |
| 5,151,763 A | 9/1992 | Marek et al. .................. 357/26 |
| 5,153,770 A | 10/1992 | Harris .......................... 359/245 |
| 5,155,604 A | 10/1992 | Miekka et al. ................. 359/2 |
| 5,155,615 A | 10/1992 | Tagawa ....................... 359/213 |
| 5,155,778 A | 10/1992 | Magel et al. .................. 385/18 |
| 5,155,812 A | 10/1992 | Ehlig et al. ................. 395/275 |
| 5,157,304 A | 10/1992 | Kane et al. .................. 313/495 |
| 5,159,485 A | 10/1992 | Nelson ....................... 359/291 |
| 5,161,042 A | 11/1992 | Hamada ........................ 359/41 |
| 5,162,787 A | 11/1992 | Thompson et al. .......... 340/794 |
| 5,164,019 A | 11/1992 | Sinton ......................... 136/249 |
| 5,165,013 A | 11/1992 | Faris ........................... 395/104 |
| 5,168,401 A | 12/1992 | Endriz ......................... 359/625 |
| 5,168,406 A | 12/1992 | Nelson ....................... 359/855 |
| 5,170,156 A | 12/1992 | DeMond et al. ............ 340/794 |
| 5,170,269 A | 12/1992 | Lin et al. ....................... 359/9 |
| 5,170,283 A | 12/1992 | O'Brien et al. ............. 359/291 |
| 5,172,161 A | 12/1992 | Nelson ....................... 355/200 |
| 5,172,262 A | 12/1992 | Hornbeck ................... 359/223 |
| 5,177,724 A | 1/1993 | Gelbart .................... 369/44.16 |

| | | | | | |
|---|---|---|---|---|---|
| 5,178,728 A | 1/1993 | Boysel et al. ............... 156/656 | 5,287,215 A | 2/1994 | Warde et al. ............... 359/293 |
| 5,179,274 A | 1/1993 | Sampsell ................. 250/208.2 | 5,289,172 A | 2/1994 | Gale, Jr. et al. ............ 345/108 |
| 5,179,367 A | 1/1993 | Shimizu .................... 340/700 | 5,291,317 A | 3/1994 | Newswanger ................ 359/15 |
| 5,181,231 A | 1/1993 | Parikh et al. ................. 377/26 | 5,291,473 A | 3/1994 | Pauli ......................... 369/112 |
| 5,182,665 A | 1/1993 | O'Callaghan et al. ........ 359/95 | 5,293,511 A | 3/1994 | Poradish et al. ............ 257/434 |
| 5,185,660 A | 2/1993 | Um ............................. 358/60 | 5,296,408 A | 3/1994 | Wilbarg et al. ............. 437/203 |
| 5,188,280 A | 2/1993 | Nakao et al. .............. 228/123 | 5,296,891 A | 3/1994 | Vogt et al. .................... 355/67 |
| 5,189,404 A | 2/1993 | Masimo et al. ............ 340/720 | 5,296,950 A | 3/1994 | Lin et al. ....................... 359/9 |
| 5,189,505 A | 2/1993 | Bartelink .................. 257/419 | 5,298,460 A | 3/1994 | Nishiguchi et al. ......... 437/183 |
| 5,191,405 A | 3/1993 | Tomita et al. ............. 257/777 | 5,299,037 A | 3/1994 | Sakata ........................ 359/41 |
| 5,192,864 A | 3/1993 | McEwen et al. ........... 250/234 | 5,299,289 A | 3/1994 | Omae et al. ................ 359/95 |
| 5,192,946 A | 3/1993 | Thompson et al. ........ 340/794 | 5,300,813 A | 4/1994 | Joshi et al. ................ 257/752 |
| 5,198,895 A | 3/1993 | Vick .......................... 358/103 | 5,301,062 A | 4/1994 | Takahashi et al. .......... 359/567 |
| D334,557 S | 4/1993 | Hunter et al. ............. D14/372 | 5,303,043 A | 4/1994 | Glenn ......................... 348/40 |
| D334,742 S | 4/1993 | Hunter et al. ............. D14/371 | 5,303,055 A | 4/1994 | Hendrix et al. ............. 348/761 |
| 5,202,785 A | 4/1993 | Nelson ...................... 359/214 | 5,307,056 A | 4/1994 | Urbanus .................... 340/189 |
| 5,206,629 A | 4/1993 | DeMond et al. ........... 340/719 | 5,307,185 A | 4/1994 | Jones et al. ................. 359/41 |
| 5,208,818 A | 5/1993 | Gelbart et al. ................ 372/30 | 5,310,624 A | 5/1994 | Ehrlich ....................... 430/322 |
| 5,208,891 A | 5/1993 | Prysner ...................... 385/116 | 5,311,349 A | 5/1994 | Anderson et al. ........... 359/223 |
| 5,210,637 A | 5/1993 | Puzey ........................ 359/263 | 5,311,360 A | 5/1994 | Bloom et al. ............... 359/572 |
| 5,212,115 A | 5/1993 | Cho et al. ................... 437/208 | 5,312,513 A | 5/1994 | Florence et al. ............. 156/643 |
| 5,212,555 A | 5/1993 | Stoltz ........................ 358/206 | 5,313,479 A | 5/1994 | Florence ...................... 372/26 |
| 5,212,582 A | 5/1993 | Nelson ...................... 359/224 | 5,313,648 A | 5/1994 | Ehlig et al. ................. 395/800 |
| 5,214,308 A | 5/1993 | Nishiguchi et al. ........ 257/692 | 5,313,835 A | 5/1994 | Dunn ........................... 73/505 |
| 5,214,419 A | 5/1993 | DeMond et al. ........... 340/794 | 5,315,418 A | 5/1994 | Sprague et al. ............... 359/41 |
| 5,214,420 A | 5/1993 | Thompson et al. ........ 340/795 | 5,315,423 A | 5/1994 | Hong ......................... 359/124 |
| 5,216,537 A | 6/1993 | Hornbeck ................... 359/291 | 5,315,429 A | 5/1994 | Abramov .................... 359/224 |
| 5,216,544 A | 6/1993 | Horikawa et al. .......... 359/622 | 5,319,214 A | 6/1994 | Gregory et al. ......... 250/504 R |
| 5,219,794 A | 6/1993 | Satoh et al. ................ 437/209 | 5,319,668 A | 6/1994 | Luecke ....................... 372/107 |
| 5,220,200 A | 6/1993 | Blanton ..................... 257/778 | 5,319,789 A | 6/1994 | Gregory et al. ............. 395/800 |
| 5,221,400 A | 6/1993 | Staller et al. ............... 156/292 | 5,319,792 A | 6/1994 | Ehlig et al. ................. 395/800 |
| 5,221,982 A | 6/1993 | Faris ............................ 359/93 | 5,321,416 A | 6/1994 | Bassett et al. .................. 345/8 |
| 5,224,088 A | 6/1993 | Atiya .......................... 369/97 | 5,323,002 A | 6/1994 | Sampsell et al. ......... 250/252.1 |
| D337,320 S | 7/1993 | Hunter et al. ............. D14/372 | 5,323,051 A | 6/1994 | Adams et al. ............... 257/417 |
| 5,226,099 A | 7/1993 | Mignardi et al. ............. 385/19 | 5,325,116 A | 6/1994 | Sampsell .................... 346/108 |
| 5,229,597 A | 7/1993 | Fukatsu ................... 250/208.2 | 5,327,286 A | 7/1994 | Sampsell et al. ........... 359/561 |
| 5,230,005 A | 7/1993 | Rubino et al. ................ 372/20 | 5,329,289 A | 7/1994 | Sakamoto et al. .......... 345/126 |
| 5,231,363 A | 7/1993 | Sano et al. ................. 332/109 | 5,330,301 A | 7/1994 | Brancher .................... 414/417 |
| 5,231,388 A | 7/1993 | Stoltz ........................ 340/783 | 5,330,878 A | 7/1994 | Nelson ...................... 430/311 |
| 5,231,432 A | 7/1993 | Glenn ......................... 353/31 | 5,331,454 A | 7/1994 | Hornbeck ................... 359/224 |
| 5,233,456 A | 8/1993 | Nelson ...................... 359/214 | 5,334,991 A | 8/1994 | Wells et al. .................... 345/8 |
| 5,233,460 A | 8/1993 | Partlo et al. ................ 359/247 | 5,339,116 A | 8/1994 | Urbanus et al. ............. 348/716 |
| 5,233,874 A | 8/1993 | Putty et al. ............. 73/517 AV | 5,339,177 A | 8/1994 | Jenkins et al. ................ 359/35 |
| 5,237,340 A | 8/1993 | Nelson ...................... 346/108 | 5,340,772 A | 8/1994 | Rosotker .................... 437/226 |
| 5,237,435 A | 8/1993 | Kurematsu et al. ........... 359/41 | 5,345,521 A | 9/1994 | McDonald et al. ............ 385/19 |
| 5,239,448 A | 8/1993 | Perkins et al. .............. 361/764 | 5,347,321 A | 9/1994 | Gove ......................... 348/663 |
| 5,239,806 A | 8/1993 | Maslakow ................... 53/432 | 5,347,378 A | 9/1994 | Handschy et al. ............ 359/53 |
| 5,240,818 A | 8/1993 | Mignardi et al. ........... 430/321 | 5,347,433 A | 9/1994 | Sedlmayr ..................... 362/32 |
| 5,245,686 A | 9/1993 | Faris et al. ................. 385/120 | 5,348,619 A | 9/1994 | Bohannon et al. .......... 156/664 |
| 5,247,180 A | 9/1993 | Mitcham et al. ......... 250/492.1 | 5,349,687 A | 9/1994 | Ehlig et al. ................. 395/800 |
| 5,247,593 A | 9/1993 | Lin et al. ..................... 385/17 | 5,351,052 A | 9/1994 | D'Hont et al. ............... 342/42 |
| 5,249,245 A | 9/1993 | Lebby et al. ................. 385/89 | 5,352,926 A | 10/1994 | Andrews .................... 257/717 |
| 5,251,057 A | 10/1993 | Guerin et al. ............... 359/249 | 5,354,416 A | 10/1994 | Okudaira et al. ............ 156/643 |
| 5,251,058 A | 10/1993 | MacArthur ................. 359/249 | 5,357,369 A | 10/1994 | Pilling et al. ............... 359/462 |
| 5,254,980 A | 10/1993 | Hendrix et al. ............... 345/84 | 5,357,803 A | 10/1994 | Lane ......................... 73/517 B |
| 5,255,100 A | 10/1993 | Urbanus .................... 358/231 | 5,359,349 A | 10/1994 | Jambor et al. .............. 345/168 |
| 5,256,869 A | 10/1993 | Lin et al. ................. 250/201.9 | 5,359,451 A | 10/1994 | Gelbart et al. ............. 359/285 |
| 5,258,325 A | 11/1993 | Spitzer et al. ................ 437/86 | 5,363,220 A | 11/1994 | Kuwayama et al. ........... 359/3 |
| 5,260,718 A | 11/1993 | Rommelmann et al. 346/107 R | 5,365,283 A | 11/1994 | Doherty et al. ............. 348/743 |
| 5,260,798 A | 11/1993 | Um et al. ................... 358/233 | 5,367,585 A | 11/1994 | Ghezzo et al. ................ 385/23 |
| 5,262,000 A | 11/1993 | Welbourn et al. ........... 156/643 | 5,370,742 A | 12/1994 | Mitchell et al. ............. 134/10 |
| 5,272,473 A | 12/1993 | Thompson et al. ............. 345/7 | 5,371,543 A | 12/1994 | Anderson .................... 348/270 |
| 5,278,652 A | 1/1994 | Urbanus et al. ............ 358/160 | 5,371,618 A | 12/1994 | Tai et al. ...................... 356/53 |
| 5,278,925 A | 1/1994 | Boysel et al. ................ 385/14 | 5,377,705 A | 1/1995 | Smith, Jr. et al. .......... 134/95.3 |
| 5,280,277 A | 1/1994 | Hornbeck .................. 345/108 | 5,382,961 A | 1/1995 | Gale, Jr. ..................... 345/108 |
| 5,281,887 A | 1/1994 | Engle ........................ 310/335 | 5,387,924 A | 2/1995 | Gale, Jr. et al. ............. 345/108 |
| 5,281,957 A | 1/1994 | Schoolman .................. 345/8 | 5,389,182 A | 2/1995 | Mignardi .................... 156/344 |
| 5,285,105 A | 2/1994 | Cain ......................... 257/672 | 5,391,881 A | 2/1995 | Jeuch et al. ............. 250/370.09 |
| 5,285,196 A | 2/1994 | Gale, Jr. .................... 345/108 | 5,392,140 A | 2/1995 | Ezra et al. .................... 359/41 |
| 5,285,407 A | 2/1994 | Gale et al. ............. 365/189.11 | 5,392,151 A | 2/1995 | Nelson ...................... 359/223 |
| 5,287,096 A | 2/1994 | Thompson et al. .......... 345/147 | 5,394,303 A | 2/1995 | Yamaji ....................... 361/749 |

| | | | | | | |
|---|---|---|---|---|---|---|
| 5,398,071 A | 3/1995 | Gove et al. ................ 348/558 | | 5,486,841 A | 1/1996 | Hara et al. .................... 345/8 |
| 5,399,898 A | 3/1995 | Rostoker .................... 257/499 | | 5,486,946 A | 1/1996 | Jachimowicz et al. ...... 359/263 |
| 5,404,365 A | 4/1995 | Hiiro .......................... 372/27 | | 5,488,431 A | 1/1996 | Gove et al. ................ 348/716 |
| 5,404,485 A | 4/1995 | Ban ........................... 395/425 | | 5,489,952 A | 2/1996 | Gove et al. ................ 348/771 |
| 5,408,123 A | 4/1995 | Murai ........................ 257/531 | | 5,490,009 A | 2/1996 | Venkateswar et al. ...... 359/291 |
| 5,410,315 A | 4/1995 | Huber ........................ 342/42 | | 5,491,510 A | 2/1996 | Gove .......................... 348/77 |
| 5,411,769 A | 5/1995 | Hornbeck ................... 427/534 | | 5,491,612 A | 2/1996 | Nicewarner, Jr. ............ 361/760 |
| 5,412,186 A | 5/1995 | Gale .......................... 219/679 | | 5,491,715 A | 2/1996 | Flaxl ......................... 375/344 |
| 5,412,501 A | 5/1995 | Fisli .......................... 359/286 | | 5,493,177 A | 2/1996 | Muller et al. ............... 313/578 |
| 5,418,584 A | 5/1995 | Larson ...................... 353/122 | | 5,493,439 A | 2/1996 | Engle ........................ 359/292 |
| 5,420,655 A | 5/1995 | Shimizu ..................... 353/33 | | 5,497,172 A | 3/1996 | Doherty et al. .............. 345/85 |
| 5,420,722 A | 5/1995 | Bielak ........................ 359/708 | | 5,497,197 A | 3/1996 | Gove et al. ................ 348/388 |
| 5,426,072 A | 6/1995 | Finnila ....................... 437/208 | | 5,497,262 A | 3/1996 | Kaeriyama .................. 359/223 |
| 5,427,975 A | 6/1995 | Sparks et al. ................ 437/79 | | 5,499,060 A | 3/1996 | Gove et al. ................ 348/651 |
| 5,430,524 A | 7/1995 | Nelson ....................... 355/200 | | 5,499,062 A | 3/1996 | Urbanus ..................... 348/771 |
| 5,435,876 A | 7/1995 | Alfaro et al. ............... 156/247 | | 5,500,761 A | 3/1996 | Goossen et al. ............. 359/290 |
| 5,438,477 A | 8/1995 | Pasch ......................... 361/689 | | 5,502,481 A | 3/1996 | Dentinger et al. ........... 348/51 |
| 5,439,731 A | 8/1995 | Li et al. ...................... 428/209 | | 5,504,504 A | 4/1996 | Markandey et al. ......... 345/214 |
| 5,442,411 A | 8/1995 | Urbanus et al. ............. 348/771 | | 5,504,514 A | 4/1996 | Nelson ....................... 347/130 |
| 5,442,414 A | 8/1995 | Janssen et al. ............... 353/98 | | 5,504,575 A | 4/1996 | Stafford ...................... 356/330 |
| 5,444,566 A | 8/1995 | Gale et al. .................. 359/291 | | 5,504,614 A | 4/1996 | Webb et al. ................. 359/223 |
| 5,445,559 A | 8/1995 | Gale et al. .................. 451/388 | | 5,506,171 A | 4/1996 | Leonard et al. ............. 437/187 |
| 5,446,479 A | 8/1995 | Thompson et al. .......... 345/139 | | 5,506,597 A | 4/1996 | Thompson et al. ............ 345/85 |
| 5,447,600 A | 9/1995 | Webb .......................... 216/2 | | 5,506,720 A | 4/1996 | Yoon .......................... 359/224 |
| 5,448,314 A | 9/1995 | Heimbuch et al. ........... 348/743 | | 5,508,558 A | 4/1996 | Robinette, Jr. et al. ....... 257/700 |
| 5,448,546 A | 9/1995 | Pauli .......................... 369/112 | | 5,508,561 A | 4/1996 | Tago et al. .................. 257/737 |
| 5,450,088 A | 9/1995 | Meier et al. ................. 342/51 | | 5,508,565 A | 4/1996 | Hatakeyama et al. ........ 257/777 |
| 5,450,219 A | 9/1995 | Gold et al. ................... 359/40 | | 5,508,750 A | 4/1996 | Hewlett et al. .............. 348/558 |
| 5,451,103 A | 9/1995 | Hatanaka et al. ............ 353/31 | | 5,508,840 A | 4/1996 | Vogel et al. ................. 359/291 |
| 5,452,024 A | 9/1995 | Sampsell ..................... 348/755 | | 5,508,841 A | 4/1996 | Lin et al. ..................... 359/318 |
| 5,452,138 A | 9/1995 | Mignardi et al. ............. 359/855 | | 5,510,758 A | 4/1996 | Fujita et al. .................. 333/247 |
| 5,453,747 A | 9/1995 | D'Hont et al. ............... 342/42 | | 5,510,824 A | 4/1996 | Nelson ........................ 347/239 |
| 5,453,778 A | 9/1995 | Venkateswar et al. ...... 347/239 | | 5,512,374 A | 4/1996 | Wallace et al. .............. 428/422 |
| 5,453,803 A | 9/1995 | Shapiro et al. .............. 353/119 | | 5,512,748 A | 4/1996 | Hanson ....................... 250/332 |
| 5,454,160 A | 10/1995 | Nickel ........................ 29/840 | | 5,515,076 A | 5/1996 | Thompson et al. .......... 345/139 |
| 5,454,906 A | 10/1995 | Baker et al. ................. 216/66 | | 5,516,125 A | 5/1996 | McKenna ..................... 279/3 |
| 5,455,445 A | 10/1995 | Kurtz et al. ................. 257/419 | | 5,517,340 A | 5/1996 | Doany et al. ................. 359/41 |
| 5,455,455 A | 10/1995 | Badehi ........................ 257/690 | | 5,517,347 A | 5/1996 | Sampsell ..................... 359/224 |
| 5,455,602 A | 10/1995 | Tew ........................... 347/239 | | 5,517,357 A | 5/1996 | Shibayama .................. 359/547 |
| 5,457,493 A | 10/1995 | Leddy et al. ................. 348/164 | | 5,517,359 A | 5/1996 | Gelbart ....................... 359/623 |
| 5,457,566 A | 10/1995 | Sampsell et al. ............. 359/292 | | 5,519,251 A | 5/1996 | Sato et al. ................... 257/666 |
| 5,457,567 A | 10/1995 | Shinohara ................... 359/305 | | 5,519,450 A | 5/1996 | Urbanus et al. ............. 348/600 |
| 5,458,716 A | 10/1995 | Alfaro et al. ............... 156/245 | | 5,521,748 A | 5/1996 | Sarraf ......................... 359/321 |
| 5,459,492 A | 10/1995 | Venkateswar ............... 347/253 | | 5,523,619 A | 6/1996 | McAllister et al. .......... 257/686 |
| 5,459,528 A | 10/1995 | Pettitt ......................... 348/568 | | 5,523,628 A | 6/1996 | Williams et al. ............. 257/777 |
| 5,459,592 A | 10/1995 | Shibatani et al. ............ 359/40 | | 5,523,803 A | 6/1996 | Urbanus et al. ............. 348/771 |
| 5,459,610 A | 10/1995 | Bloom et al. ............... 359/572 | | 5,523,878 A | 6/1996 | Wallace et al. .............. 359/290 |
| 5,461,197 A | 10/1995 | Hiruta et al. ................ 174/52.4 | | 5,523,881 A | 6/1996 | Florence et al. ............. 359/561 |
| 5,461,410 A | 10/1995 | Venkateswar et al. ...... 347/240 | | 5,523,920 A | 6/1996 | Machuga et al. ............ 361/767 |
| 5,461,411 A | 10/1995 | Florence et al. ............. 347/240 | | 5,524,155 A | 6/1996 | Weaver ....................... 385/24 |
| 5,461,547 A | 10/1995 | Ciupke et al. ............... 362/31 | | 5,526,834 A | 6/1996 | Mielnik et al. .............. 134/105 |
| 5,463,347 A | 10/1995 | Jones et al. .................. 330/253 | | 5,534,107 A | 7/1996 | Gray et al. ................ 156/643.1 |
| 5,463,497 A | 10/1995 | Muraki et al. ............... 359/618 | | 5,534,883 A | 7/1996 | Koh ............................ 345/3 |
| 5,465,175 A | 11/1995 | Woodgate et al. ........... 359/463 | | 5,539,422 A | 7/1996 | Heacock et al. .............. 345/8 |
| 5,467,106 A | 11/1995 | Salomon ..................... 345/87 | | 5,544,306 A | 8/1996 | Deering et al. .............. 395/164 |
| 5,467,138 A | 11/1995 | Gove ......................... 348/452 | | 5,554,304 A | 9/1996 | Suzuki ........................ 216/2 |
| 5,467,146 A | 11/1995 | Huang et al. ................ 348/743 | | 5,576,878 A | 11/1996 | Henck ........................ 359/224 |
| 5,469,302 A | 11/1995 | Lim ........................... 359/846 | | 5,602,671 A | 2/1997 | Hornbeck .................... 359/224 |
| 5,471,341 A | 11/1995 | Warde et al. ................ 359/293 | | 5,606,181 A | 2/1997 | Sakuma et al. ............... 257/88 |
| 5,473,512 A | 12/1995 | Degani et al. ............... 361/760 | | 5,606,447 A | 2/1997 | Asada et al. ................. 359/199 |
| 5,475,236 A | 12/1995 | Yoshizaki .................... 257/48 | | 5,610,438 A | 3/1997 | Wallace et al. .............. 257/682 |
| 5,480,839 A | 1/1996 | Ezawa et al. ................ 437/209 | | 5,623,361 A | 4/1997 | Engle ......................... 359/291 |
| 5,481,118 A | 1/1996 | Tew ........................... 250/551 | | 5,629,566 A | 5/1997 | Doi et al. ..................... 257/789 |
| 5,481,133 A | 1/1996 | Hsu ........................... 257/621 | | 5,629,801 A | 5/1997 | Staker et al. ................. 359/572 |
| 5,482,564 A | 1/1996 | Douglas et al. ............. 134/18 | | 5,640,216 A | 6/1997 | Hasegawa et al. ........... 349/58 |
| 5,482,818 A | 1/1996 | Nelson ........................ 430/394 | | 5,658,698 A | 8/1997 | Yagi et al. ................... 430/11 |
| 5,483,307 A | 1/1996 | Anderson .................... 353/98 | | 5,661,592 A | 8/1997 | Bornstein et al. ............ 359/291 |
| 5,485,172 A | 1/1996 | Sawachika et al. ........... 345/8 | | 5,661,593 A | 8/1997 | Engle ......................... 359/292 |
| 5,485,304 A | 1/1996 | Kaeriyama .................. 359/291 | | 5,663,817 A | 9/1997 | Frapin et al. ................. 349/5 |
| 5,485,354 A | 1/1996 | Ciupke et al. ............... 362/31 | | 5,668,611 A | 9/1997 | Ernstoff et al. .............. 348/771 |
| 5,486,698 A | 1/1996 | Hanson et al. ............... 250/332 | | 5,673,139 A | 9/1997 | Johnson ...................... 359/291 |

| Patent | Date | Inventor | Class |
|---|---|---|---|
| 5,677,783 A | 10/1997 | Bloom et al. | 359/224 |
| 5,689,361 A | 11/1997 | Damen et al. | 359/284 |
| 5,691,836 A | 11/1997 | Clark | 359/247 |
| 5,694,740 A | 12/1997 | Martin et al. | 53/431 |
| 5,696,560 A | 12/1997 | Songer | 348/436 |
| 5,699,740 A | 12/1997 | Gelbart | 101/477 |
| 5,704,700 A | 1/1998 | Kappel et al. | 353/31 |
| 5,707,160 A | 1/1998 | Bowen | 400/472 |
| 5,712,649 A | 1/1998 | Tosaki | 345/8 |
| 5,713,652 A | 2/1998 | Zavracky et al. | 353/122 |
| 5,726,480 A | 3/1998 | Pister | 257/415 |
| 5,731,802 A | 3/1998 | Aras et al. | 345/148 |
| 5,734,224 A | 3/1998 | Tagawa et al. | 313/493 |
| 5,742,373 A | 4/1998 | Alvelda | 349/204 |
| 5,744,752 A | 4/1998 | McHerron et al. | 174/52.4 |
| 5,745,271 A | 4/1998 | Ford et al. | 359/130 |
| 5,757,354 A | 5/1998 | Kawamura | 345/126 |
| 5,757,536 A | 5/1998 | Ricco et al. | 359/224 |
| 5,764,280 A | 6/1998 | Bloom et al. | 348/53 |
| 5,768,009 A | 6/1998 | Little | 359/293 |
| 5,770,473 A | 6/1998 | Hall et al. | 438/26 |
| 5,793,519 A | 8/1998 | Furlani et al. | 359/291 |
| 5,798,743 A | 8/1998 | Bloom | 345/90 |
| 5,798,805 A | 8/1998 | Ooi et al. | 349/10 |
| 5,801,074 A | 9/1998 | Kim et al. | 438/125 |
| 5,802,222 A | 9/1998 | Rasch et al. | 385/1 |
| 5,808,323 A | 9/1998 | Spaeth et al. | 257/88 |
| 5,808,797 A | 9/1998 | Bloom et al. | 359/572 |
| 5,815,126 A | 9/1998 | Fan et al. | 345/8 |
| 5,825,443 A | 10/1998 | Kawasaki et al. | 349/95 |
| 5,835,255 A | 11/1998 | Miles | 359/291 |
| 5,835,256 A | 11/1998 | Huibers | 359/291 |
| 5,837,562 A | 11/1998 | Cho | 438/51 |
| 5,841,579 A | 11/1998 | Bloom et al. | 359/572 |
| 5,844,711 A | 12/1998 | Long, Jr. | 359/291 |
| 5,847,859 A | 12/1998 | Murata | 359/201 |
| 5,862,164 A | 1/1999 | Hill | 372/27 |
| 5,868,854 A | 2/1999 | Kojima et al. | 134/1.3 |
| 5,886,675 A | 3/1999 | Aye et al. | 345/7 |
| 5,892,505 A | 4/1999 | Tropper | 345/208 |
| 5,895,233 A | 4/1999 | Higashi et al. | 438/107 |
| 5,898,515 A | 4/1999 | Furlani et al. | 359/290 |
| 5,903,243 A | 5/1999 | Jones | 345/7 |
| 5,903,395 A | 5/1999 | Rallison et al. | 359/630 |
| 5,904,737 A | 5/1999 | Preston et al. | 8/158 |
| 5,910,856 A | 6/1999 | Ghosh et al. | 359/291 |
| 5,912,094 A | 6/1999 | Aksyuk et al. | 430/5 |
| 5,912,608 A | 6/1999 | Asada | 335/222 |
| 5,914,801 A | 6/1999 | Dhuler et al. | 359/230 |
| 5,915,168 A | 6/1999 | Salatino et al. | 438/110 |
| 5,919,548 A | 7/1999 | Barron et al. | 428/138 |
| 5,920,411 A | 7/1999 | Duck et al. | 359/127 |
| 5,920,418 A | 7/1999 | Shiono et al. | 359/246 |
| 5,923,475 A | 7/1999 | Kurtz et al. | 359/619 |
| 5,926,309 A | 7/1999 | Little | 359/293 |
| 5,926,318 A | 7/1999 | Hebert | 359/618 |
| 5,942,791 A | 8/1999 | Shorrocks et al. | 257/522 |
| 5,949,390 A | 9/1999 | Nomura et al. | 345/32 |
| 5,949,570 A | 9/1999 | Shiono et al. | 359/291 |
| 5,953,161 A | 9/1999 | Troxell et al. | 359/618 |
| 5,955,771 A | 9/1999 | Kurtz et al. | 257/419 |
| 5,963,788 A | 10/1999 | Barron et al. | 438/48 |
| 5,978,127 A | 11/1999 | Berg | 359/279 |
| 5,982,553 A | 11/1999 | Bloom et al. | 359/627 |
| 5,986,634 A | 11/1999 | Alioshin | 345/126 |
| 5,986,796 A | 11/1999 | Miles | 359/260 |
| 5,995,303 A | 11/1999 | Honguh et al. | 359/708 |
| 5,999,319 A | 12/1999 | Castracane | 359/573 |
| 6,004,912 A | 12/1999 | Gudeman | 508/577 |
| 6,016,222 A | 1/2000 | Setani et al. | 359/571 |
| 6,025,859 A | 2/2000 | Ide et al. | 347/135 |
| 6,038,057 A | 3/2000 | Brazas, Jr. et al. | 359/291 |
| 6,040,748 A | 3/2000 | Gueissaz | 335/78 |
| 6,046,840 A | 4/2000 | Huibers | 359/291 |
| 6,055,090 A | 4/2000 | Miles | 359/291 |
| 6,057,520 A | 5/2000 | Goodwin-Johansson | 200/181 |
| 6,061,166 A | 5/2000 | Furlani et al. | 359/254 |
| 6,061,489 A | 5/2000 | Ezra | 385/115 |
| 6,062,461 A | 5/2000 | Sparks et al. | 228/123.1 |
| 6,064,404 A | 5/2000 | Aras et al. | 345/507 |
| 6,069,392 A | 5/2000 | Tai et al. | 257/419 |
| 6,071,652 A | 6/2000 | Feldman et al. | 430/5 |
| 6,075,632 A | 6/2000 | Braun | 359/124 |
| 6,084,626 A | 7/2000 | Ramanujan et al. | 347/239 |
| 6,088,102 A | 7/2000 | Manhart | 356/354 |
| 6,090,717 A | 7/2000 | Powell et al. | 438/710 |
| 6,091,521 A | 7/2000 | Popovich | 359/15 |
| 6,094,294 A * | 7/2000 | Yokoyama et al. | 359/290 |
| 6,096,576 A | 8/2000 | Corbin et al. | 438/108 |
| 6,097,352 A | 8/2000 | Zavracky et al. | 345/7 |
| 6,101,036 A | 8/2000 | Bloom | 359/567 |
| 6,115,168 A | 9/2000 | Zhao et al. | 359/247 |
| 6,122,299 A | 9/2000 | DeMars et al. | 372/20 |
| 6,123,985 A | 9/2000 | Robinson et al. | 427/162 |
| 6,124,145 A | 9/2000 | Stemme et al. | 438/26 |
| 6,130,770 A | 10/2000 | Bloom | 359/224 |
| 6,144,481 A | 11/2000 | Kowarz et al. | 359/291 |
| 6,147,789 A | 11/2000 | Gelbart | 359/231 |
| 6,154,259 A | 11/2000 | Hargis et al. | 348/756 |
| 6,154,305 A | 11/2000 | Dickensheets et al. | 438/24 |
| 6,163,026 A | 12/2000 | Bawolek et al. | 250/351 |
| 6,163,402 A | 12/2000 | Chou et al. | 359/443 |
| 6,169,624 B1 | 1/2001 | Godil et al. | 359/237 |
| 6,172,796 B1 | 1/2001 | Kowarz et al. | 359/290 |
| 6,172,797 B1 | 1/2001 | Huibers | 359/291 |
| 6,177,980 B1 | 1/2001 | Johnson | 355/67 |
| 6,181,458 B1 | 1/2001 | Brazas, Jr. et al. | 359/290 |
| 6,188,519 B1 | 2/2001 | Johnson | 359/572 |
| 6,195,196 B1 | 2/2001 | Kimura et al. | 359/295 |
| 6,197,610 B1 | 3/2001 | Toda | 438/50 |
| 6,210,988 B1 | 4/2001 | Howe et al. | 438/50 |
| 6,215,579 B1 | 4/2001 | Bloom et al. | 359/298 |
| 6,219,015 B1 | 4/2001 | Bloom et al. | 345/87 |
| 6,222,954 B1 | 4/2001 | Riza | 385/18 |
| 6,229,650 B1 | 5/2001 | Reznichenko et al. | 359/566 |
| 6,229,683 B1 | 5/2001 | Goodwin-Johansson | 361/233 |
| 6,241,143 B1 | 6/2001 | Kuroda | 228/110.1 |
| 6,251,842 B1 | 6/2001 | Gudeman | 508/577 |
| 6,252,697 B1 | 6/2001 | Hawkins et al. | 359/290 |
| 6,254,792 B1 | 7/2001 | Van Buskirk et al. | 216/13 |
| 6,261,494 B1 | 7/2001 | Zavracky et al. | 264/104 |
| 6,268,952 B1 | 7/2001 | Godil et al. | 359/291 |
| 6,271,145 B1 | 8/2001 | Toda | 438/706 |
| 6,271,808 B1 | 8/2001 | Corbin | 345/7 |
| 6,274,469 B1 | 8/2001 | Yu | 438/592 |
| 6,286,231 B1 | 9/2001 | Bergman et al. | 34/410 |
| 6,290,859 B1 | 9/2001 | Fleming et al. | 216/2 |
| 6,290,864 B1 | 9/2001 | Patel et al. | 216/79 |
| 6,300,148 B1 | 10/2001 | Birdsley et al. | 438/15 |
| 6,303,986 B1 | 10/2001 | Shook | 257/680 |
| 6,310,018 B1 | 10/2001 | Behr et al. | 510/175 |
| 6,323,984 B1 | 11/2001 | Trisnadi | 359/245 |
| 6,327,071 B1 | 12/2001 | Kimura | 359/291 |
| 6,342,960 B1 | 1/2002 | McCullough | 359/124 |
| 6,356,577 B1 | 3/2002 | Miller | 372/107 |
| 6,356,689 B1 | 3/2002 | Greywall | 385/52 |
| 6,359,333 B1 | 3/2002 | Wood et al. | 257/704 |
| 6,384,959 B1 | 5/2002 | Furlani et al. | 359/291 |
| 6,387,723 B1 | 5/2002 | Payne et al. | 438/48 |
| 6,392,309 B1 | 5/2002 | Wataya et al. | 257/796 |
| 6,396,789 B1 | 5/2002 | Guerra et al. | 369/112 |
| 6,421,179 B1 | 7/2002 | Gutin et al. | 359/572 |

| | | | |
|---|---|---|---|
| 6,438,954 B1 | 8/2002 | Goetz et al. ................... | 60/527 |
| 6,445,502 B1 | 9/2002 | Islam et al. ................... | 359/571 |
| 6,452,260 B1 | 9/2002 | Corbin et al. ................ | 257/686 |
| 6,466,354 B1 | 10/2002 | Gudeman .................... | 359/247 |
| 6,480,634 B1 | 11/2002 | Corrigan ........................ | 385/4 |
| 6,497,490 B1 | 12/2002 | Miller ........................ | 359/614 |
| 6,523,961 B2 * | 2/2003 | Ilkov et al. .................... | 353/99 |
| 6,525,863 B1 | 2/2003 | Riza ............................ | 359/290 |
| 6,532,097 B1 * | 3/2003 | Allen et al. .................. | 359/237 |
| 6,563,974 B2 | 5/2003 | Agha Riza ................... | 385/18 |
| 6,565,222 B1 | 5/2003 | Ishii et al. ................... | 359/883 |
| 6,587,253 B2 * | 7/2003 | Blech et al. .................. | 359/291 |
| 2001/0019454 A1 | 9/2001 | Tadic-Galeb et al. ....... | 359/649 |
| 2002/0015230 A1 | 2/2002 | Pilossof et al. ............. | 359/558 |
| 2002/0021485 A1 | 2/2002 | Pilossof ....................... | 359/295 |
| 2002/0079432 A1 | 6/2002 | Lee et al. .................... | 250/216 |
| 2002/0105725 A1 | 8/2002 | Sweatt et al. ................ | 359/566 |
| 2002/0112746 A1 | 8/2002 | DeYoung et al. ............. | 134/36 |
| 2002/0131230 A1 | 9/2002 | Potter ......................... | 361/277 |

FOREIGN PATENT DOCUMENTS

| | | | | |
|---|---|---|---|---|
| EP | 0 261 901 A2 | 3/1988 | ............ | G09G/3/36 |
| EP | 0 314 437 A1 | 10/1988 | ............ | H01L/25/08 |
| EP | 0 304 263 A2 | 2/1989 | ......... | H01L/25/065 |
| EP | 0 306 308 A2 | 3/1989 | ............ | H04N/3/14 |
| EP | 0 322 714 A2 | 7/1989 | ............ | G02B/5/30 |
| EP | 0 627 644 A3 | 9/1990 | ............ | G02B/27/00 |
| EP | 0 417 039 A1 | 3/1991 | ............ | G03B/21/20 |
| EP | 0 423 513 A2 | 4/1991 | ............ | H01S/3/085 |
| EP | 0 436 738 A1 | 7/1991 | ............ | H04N/5/74 |
| EP | 0 458 316 A2 | 11/1991 | ............ | G06K/11/06 |
| EP | 0 477 566 A2 | 4/1992 | ............ | G02B/26/08 |
| EP | 0 488 326 A3 | 6/1992 | ............ | G09G/3/28 |
| EP | 0 499 566 A2 | 8/1992 | ............ | G06F/3/033 |
| EP | 0 528 646 A1 | 2/1993 | ............ | G09G/3/02 |
| EP | 0 530 760 A3 | 3/1993 | ............ | G09G/3/34 |
| EP | 0 550 189 A1 | 7/1993 | ............ | G02F/1/315 |
| EP | 0 610 665 A1 | 8/1994 | ............ | G09G/3/34 |
| EP | 0 627 644 A2 | 12/1994 | ............ | G02B/27/00 |
| EP | 0 627 850 A1 | 12/1994 | ............ | H04N/5/64 |
| EP | 0 643 314 A2 | 3/1995 | ............ | G02B/27/00 |
| EP | 0 654 777 A1 | 5/1995 | ............ | G09G/3/34 |
| EP | 0 658 868 A1 | 6/1995 | ............ | G09G/3/34 |
| EP | 0 658 830 A1 | 12/1995 | ............ | G09G/3/34 |
| EP | 0 689 078 A1 | 12/1995 | ............ | G02B/26/08 |
| EP | 0 801 319 A1 | 10/1997 | ............ | G02B/26/00 |
| EP | 0 851 492 A2 | 7/1998 | ......... | H01L/23/538 |
| EP | 1 003 071 A2 | 5/2000 | ............ | G03B/27/72 |
| EP | 1 014 143 A1 | 6/2000 | ............ | G02B/26/08 |
| EP | 1 040 927 A2 | 10/2000 | ............ | B41J/2/455 |
| GB | 2 117 564 A | 10/1983 | ............ | H01L/25/08 |
| GB | 2 118 365 A | 10/1983 | ............ | H01L/27/13 |
| GB | 2 266 385 A | 10/1993 | ............ | G02B/23/10 |
| GB | 2 296 152 A | 6/1996 | ............ | H04N/13/04 |
| GB | 2 319 424 A | 5/1998 | ............ | H04N/13/04 |
| JP | 53-39068 | 4/1978 | ............ | H01L/23/12 |
| JP | 55-111151 | 8/1980 | ............ | H01L/27/00 |
| JP | 57-31166 | 2/1982 | ............ | H01L/23/48 |
| JP | 57-210638 | 12/1982 | ............ | H01L/21/60 |
| JP | 60-49638 | 3/1985 | ............ | H01L/21/60 |
| JP | 60-94756 | 5/1985 | ............ | H01L/25/04 |
| JP | 60-250639 | 12/1985 | ............ | H01L/21/58 |
| JP | 61-142750 | 6/1986 | ............ | H01L/21/60 |
| JP | 61-145838 | 7/1986 | ............ | H01L/21/60 |
| JP | 63-234767 | 9/1988 | ............ | H04N/1/04 |
| JP | 63-305323 | 12/1988 | ............ | G02F/1/13 |
| JP | 1-155637 | 6/1989 | ............ | H01L/21/66 |
| JP | 40-1155637 | 6/1989 | ............ | H01F/21/92 |
| JP | 2219092 | 8/1990 | ............ | G09G/3/28 |
| JP | 4-333015 | 11/1992 | ............ | G02B/27/18 |
| JP | 7-2811161 | 10/1995 | ......... | G02F/1/1333 |
| JP | 3288369 | 3/2002 | ............ | G02B/26/06 |
| WO | WO 90/13913 | 11/1990 | ............ | H01L/23/10 |
| WO | WO 92/12506 | 7/1992 | ............ | G09F/9/37 |
| WO | WO 93/02269 | 2/1993 | ............ | E06B/5/10 |
| WO | WO 93/09472 | 5/1993 | ............ | G03F/7/20 |

* cited by examiner

Fig. 1 (BACKGROUND)

*Fig. 2* (BACKGROUND)

*Fig. 3* (BACKGROUND)

*Fig. 4*  (BACKGROUND)

Circle      Diamond      Square      Polygon Continuous Gap

*Fig. 10*

PATTERNED DIFFRACTIVE LIGHT MODULATOR RIBBON FOR PDL REDUCTION

FIELD OF THE INVENTION

The present invention relates to an apparatus for reducing the effects of Polarization Dependent Losses (PDL). More particularly, this invention relates to a patterned diffractive light modulator ribbon for PDL reduction.

BACKGROUND OF THE INVENTION

Designers and inventors have sought to develop a light modulator which can operate alone or together with other modulators. Such modulators should provide high operating speeds (KHz frame rates), a high contrast ratio or modulation depth, have optical flatness, be compatible with VLSI processing techniques, be easy to handle and be relatively low in cost. Two such related systems are found in U.S. Pat. Nos. 5,311,360 and 5,841,579 which are hereby incorporated by reference.

Figure 1:
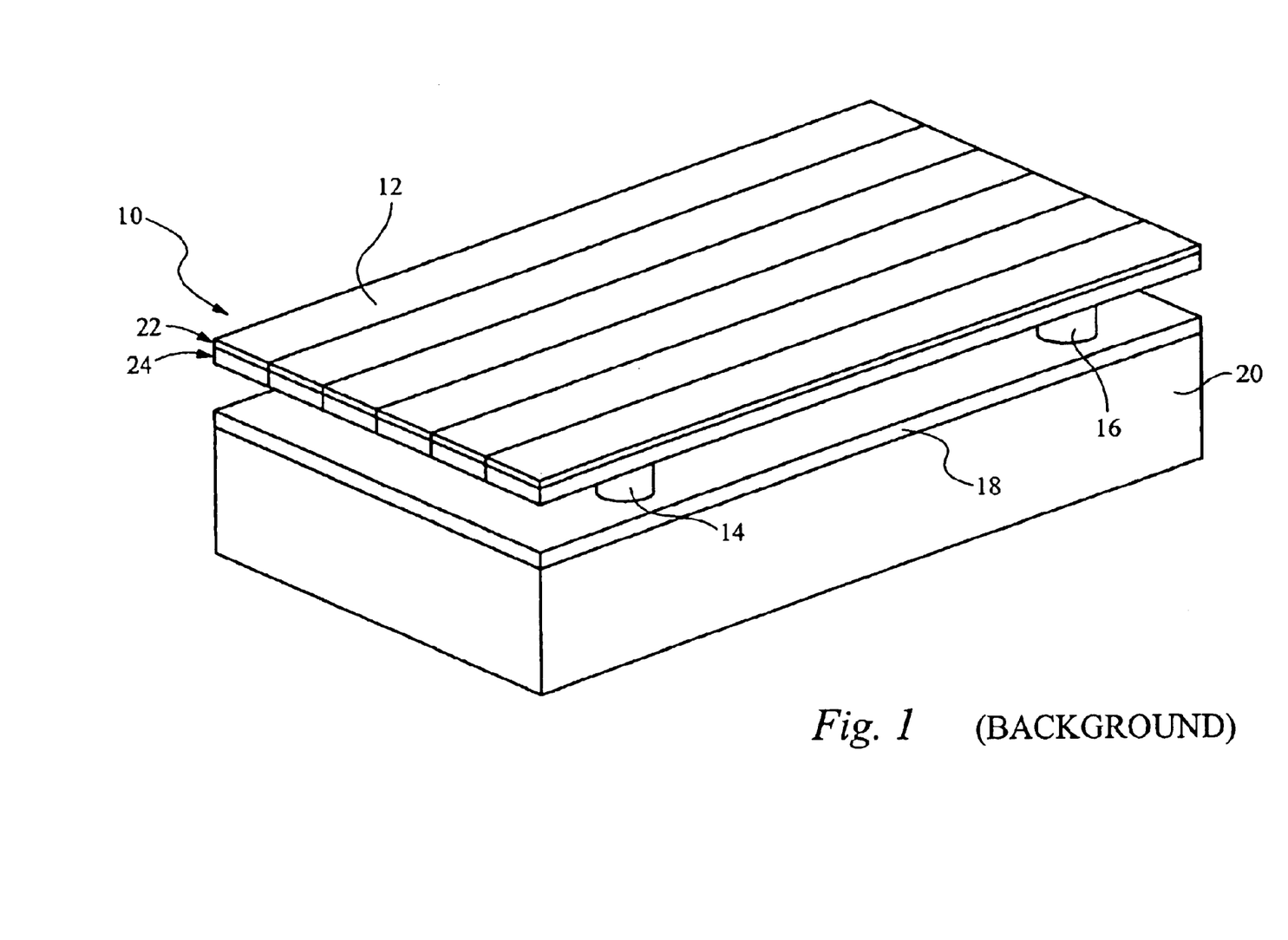
FIG. 1 illustrates an exemplary diffractive light modulator.

According to the teachings of the '360 and '579 patents, a diffractive light modulator is formed of a multiple mirrored-ribbon structure. An example of such a diffractive light modulator 10 is shown in FIG. 1. The diffractive light modulator 10 comprises elongated elements 12 suspended by first and second posts, 14 and 16, above a substrate 20. The substrate 20 comprises a conductor 18. In operation, the diffractive light modulator 10 operates to produce modulated light selected from a reflection mode and a diffraction mode.

Figure 2:
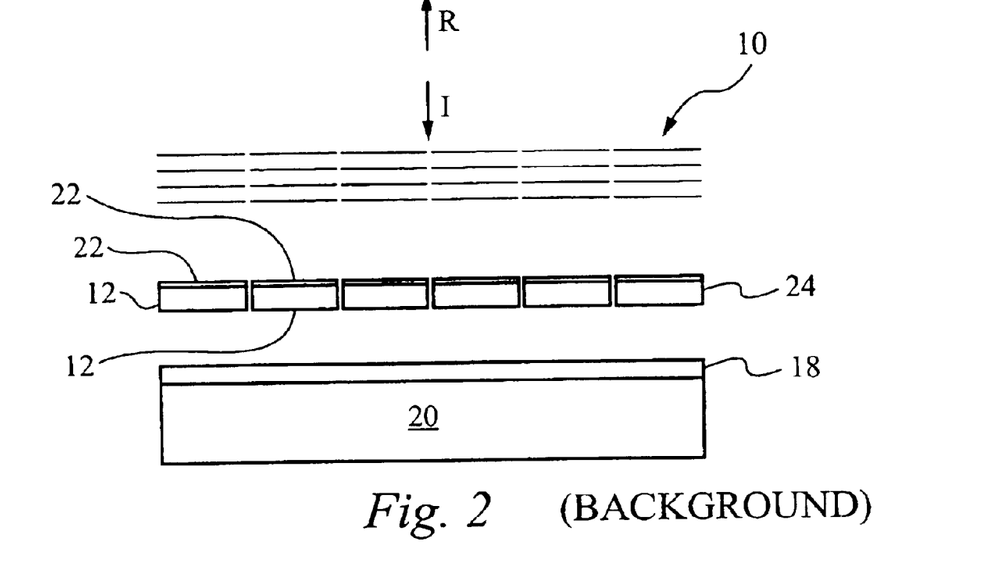
FIG. 2 illustrates a cross-section of the exemplary diffractive light modulator in a reflection mode.
Figure 3:
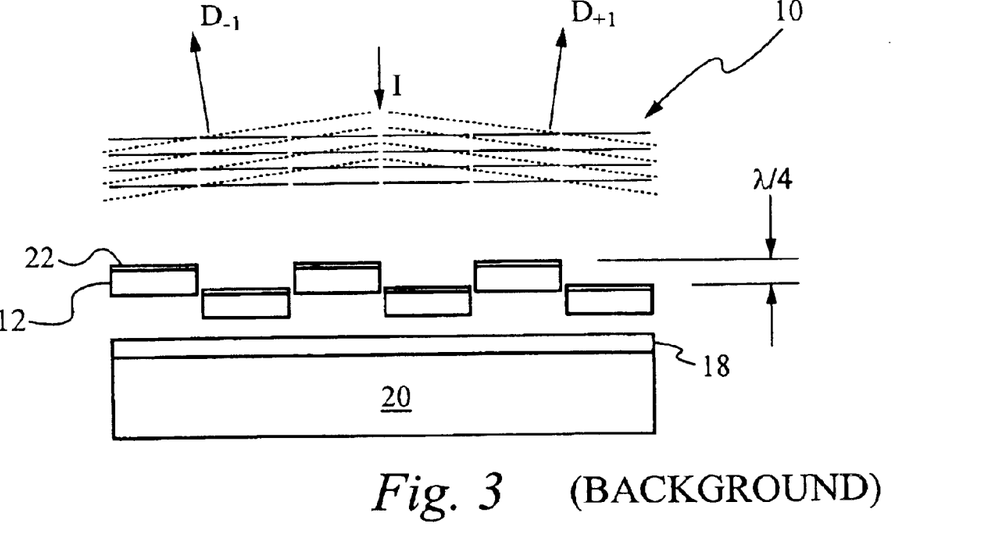
FIG. 3 illustrates a cross-section of the exemplary diffractive light modulator in a diffraction mode.

FIGS. 2 and 3 illustrate a cross-section of the diffractive light modulator 10 in a reflection mode and a diffraction mode, respectively. The elongated elements 12 comprise a conducting and reflecting surface 22 and a resilient material 24. The substrate 20 comprises the conductor 18.

FIG. 2 depicts the diffractive light modulator 10 in the reflection mode. In the reflection mode, the conducting and reflecting surfaces 22 of the elongated elements 12 form a plane so that incident light I reflects from the elongated elements 12 to produce reflected light R.

FIG. 3 depicts the diffractive light modulator 10 in the diffraction mode. In the diffraction mode, an electrical bias causes alternate ones of the elongated elements 12 to move toward the substrate 20. The electrical bias is applied between the reflecting and conducting surfaces 22 of the alternate ones of the elongated elements 12 and the conductor 18. The electrical bias results in a height difference between the alternate ones of the elongated elements 12 and non-biased ones of the elongated elements 12. A height difference of a quarter wavelength $\lambda/4$ of the incident light I produces maximum diffracted light including plus one and minus one diffraction orders, $D_{+1}$ and $D_{-1}$.

FIGS. 2 and 3 depict the diffractive light modulator 10 in the reflection and diffraction modes, respectively. For a deflection of the alternate ones of the elongated elements 12 of less than a quarter wavelength $\lambda/4$, the incident light I both reflects and diffracts producing the reflected light R and the diffracted light including the plus one and minus one diffraction orders, $D_{+1}$ and $D_{-1}$. In other words, by deflecting the alternate ones of the elongated elements 12 less the quarter wavelength $\lambda/4$, the diffractive light modulator 10 produces a variable reflectivity.

Figure 4:
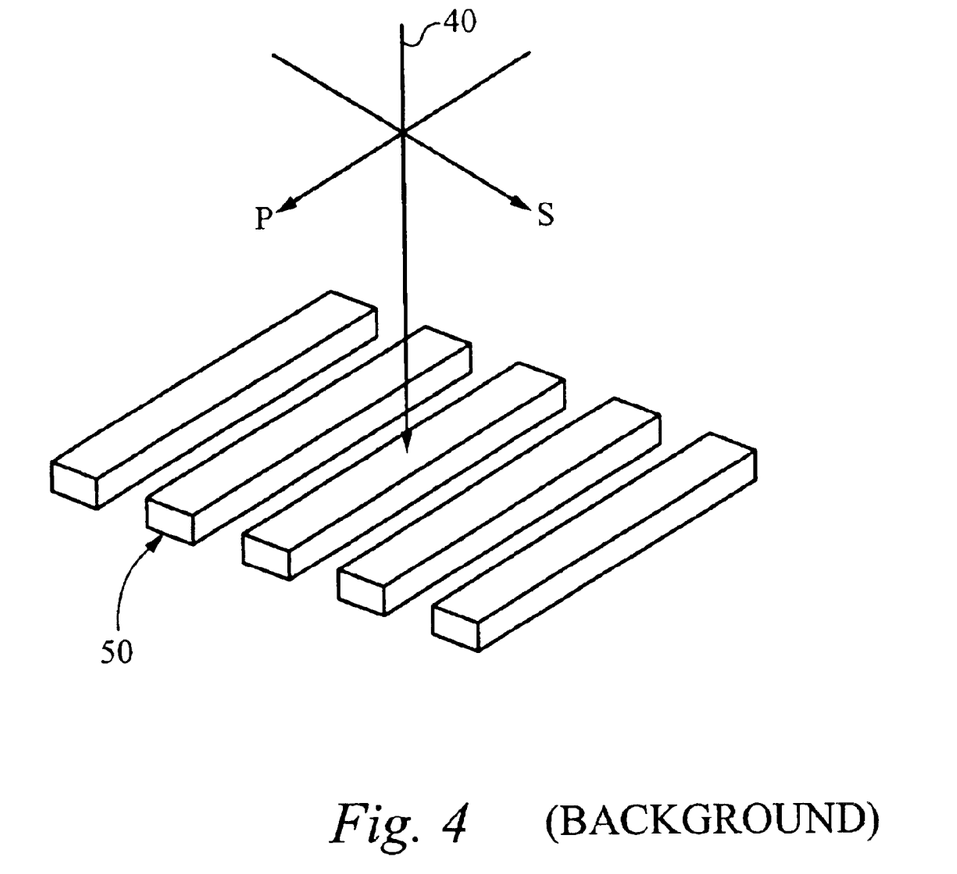
FIG. 4 illustrates an arbitrarily polarized light impinging a diffractive light modulator.

Unfortunately, when arbitrarily polarized light impinges on a linear one-dimensional (1D) diffractive light modulator, each polarization state interacts with the diffractive light modulator differently. Such a scenario is illustrated in FIG. 4 in which an incident light 40 impinges upon a diffractive light modulator 50 comprising a series of reflective ribbons placed in parallel. The incident light 40 includes a polarization state P and a polarization state S. Light polarized parallel to the ribbons (polarization state P) interacts with the diffractive light modulator 50 differently than light polarized perpendicular to the ribbons (polarization state S). Polarization states S and P each "see" different environments at the diffractive light modulator. This can lead to Polarization Dependent Losses (PDL) in which one polarization state is attenuated more than the other.

PDL can be defined as a function of the width of the ribbons and the width of the gaps between the ribbons. When the ribbon width is sufficiently large, then PDL becomes a weak function of the ribbon width. When the gap width is sufficiently small, then PDL becomes a weak function of the gap width. Theoretically, with no gaps and a single wide ribbon, there is no PDL in the center of the ribbon. However, light impinging the edge of the ribbon still experiences PDL. This is known as the edge effect or edge polarizability. Light with a polarization state perpendicular to the edge "sees" the edge differently than light polarized parallel to the edge, leading to polarization dependent loss. The polarization state of the impinging light can not be guaranteed. As a result, the edge effect is very difficult to overcome. What is needed is a light modulator that minimizes PDL due to the edge effect.

Since the polarization state of the incident light at the edge of the ribbon impacts PDL, efficiency of a diffractive light modulator can be expressed as a function of the polarization state of the incident light. In general, light includes polarization states TM and TE which are perpendicular to each other. Since the polarization state at any given time and place can not be guaranteed, the orientation of the polarization states TM and TE relative to the ribbon edges can not be predetermined. As such, a polarization state can be parallel to the ribbon edge, perpendicular to the ribbon edge, or somewhere in between. What is needed is a diffractive light modulator with an output response that is as independent of the polarization state as possible.

What is also needed is a grating system that normalizes edge effect PDL across input polarization states.

SUMMARY OF THE INVENTION

Embodiments of the present invention include a modulator for modulating an incident beam of light. The modulator includes a plurality of elements, each element including a first end, a second end, a first linear side, a second linear side, and a light reflective planar surface with the light reflective planar surfaces of the plurality of elements lying in one or more parallel planes, wherein the plurality of elements are arranged parallel to each other and further wherein the light reflective planar surface of each of the plurality of elements includes a first non-linear side and a second non-linear side. The modulator also includes a support structure coupled to each end of the plurality of elements to maintain a position of each element relative to each other and to enable movement of selective ones of the plurality of elements in a direction normal to the one or more parallel planes of the plurality of elements, and between a first modulator configuration wherein the plurality of elements act to reflect the incident beam of light as a plane mirror, and a second modulator configuration wherein the plurality of elements act to diffract the incident beam of light.

The modulator according to embodiments of the present invention wherein the first non-linear side and the second non-linear side each include one or more projections, wherein each projection is perpendicular to each of the linear side of the element and the one or more projections do not extend beyond the first linear side and the second linear side. The modulator also embodying each projection on the first non-linear side repeated according to a constant period, and each projection on the second non-linear side is repeated according to a constant period, wherein the shape of each projection is the same.

The modulator according to embodiments of the present invention also includes the projections on the first non-linear side being symmetric in relation to the projections on the second non-linear side and wherein the non-linear sides of adjacent elements are symmetrical. The modulator of the present invention is also a diffractive MEMS device and the selective ones of the elements are alternating elements and are moved by applying an electrostatic force.

According to other aspects of the embodiments, a modulator for modulating an incident beam of light including a plurality of elements, each element including a first end, a second end, a first linear side, a second linear side, and a non-continuous light reflective planar surface with the non-continuous light reflective planar surfaces of the plurality of elements lying in one or more parallel planes, wherein the elements are arranged parallel to each other and further wherein the non-continuous light reflective planar surface of each of the plurality of elements includes a first non-linear side and a second non-linear side. The modulator also includes a support structure coupled to each end of the plurality of elements to maintain a position of each element relative to each other and to enable movement of selective ones of the plurality of elements in a direction normal to the one or more parallel planes of the plurality of elements, and between a first modulator configuration wherein the plurality of elements act to reflect the incident beam of light as a plane mirror, and a second modulator configuration wherein the plurality of elements act to diffract the incident beam of light.

The modulator of the present invention wherein the first non-linear side and the second non-linear side each include one or more projections, wherein each projection is perpendicular to each of the linear sides of the element. The modulator also embodying the one or more projections not extending beyond the first linear side and the second linear side.

The modulator of the present invention also includes each projection on the first non-linear side being repeated according to a constant period, and each projection on the second non-linear side being repeated according to a constant period and wherein the shape of each projection is the same and the projections on the first non-linear side are symmetric in relation to the projections on the second non-linear side and the non-linear sides of adjacent elements are symmetrical.

The modulator of the present invention is also a diffractive MEMS device and the selective ones of the elements are alternating elements and are moved by applying an electrostatic force. The modulator of the present invention also embodies the non-continuous portion of each of the light reflective planar surfaces being non-reflective.

The present invention is also a modulator for modulating an incident beam of light including means for supporting each of a plurality of elements to maintain a position of each element relative to each other and to enable movement of selective ones of the plurality of elements in a direction normal to the one or more parallel planes of the plurality of elements, wherein each element includes a first end, a second end, a first linear side, a second linear side, and a light reflective planar surface with the light reflective planar surfaces of the plurality of elements lying in one or more parallel planes, and the elements are arranged parallel to each other and further wherein the light reflective planar surfaces of each of the plurality of elements includes a first non-linear side and a second nonlinear side. The modulator of the present invention also includes means for moving selective ones of the plurality of elements between a first modulator configuration wherein the plurality of elements act to reflect the incident beam of light as a plane mirror, and a second modulator configuration wherein the plurality of elements act to diffract the incident beam of light.

DETAILED DESCRIPTION OF THE EMBODIMENTS

The present invention overcomes deficiencies of conventional approaches by patterning the reflective surface of the ribbons to have non-linear edges within a diffractive light modulator, thereby providing ribbons with linear sides and reflective surfaces with non-linear sides. The non-linear sides of the reflective surface substantially reduce the PDL for reflection from such ribbons and also normalize the impact of the remaining PDL in response to random input polarization states. Preferably, the non-linear sides of the reflective surface form a recurring pattern. More preferably, the recurring pattern is formed by alternating arcs of various sizes. Alternatively, the recurring pattern is formed by alternating a sector of a circle and the mirror image of the sector, by alternating halves of a polygon, for example a square, rectangle or triangle, by a sinusoid, or by a zigzag. Alternatively, the non-linear sides of the reflective surface include one or more projections. The projections can form a recurring pattern or the projections can be random. The aforementioned non-linear sides of the reflective surface act to normalize the profile seen be any incident light including a random polarization state. In the case of the preferred embodiment, the non-linear sides of the reflective surface will not extend beyond the linear sides of the ribbon into the gap. Rather, the non-linear sides of the reflective surface will extend to the linear sides of the ribbon as depicted in the embodiment in FIG. 5.

A further alternative includes disrupting the continuous nature of the reflective surface by placing a patterned gap into the reflective surface. The gap can be of various shapes and sizes and be placed in a recurring pattern or at random. Such gaps in conjunction with the non-linear nature of the reflective surface have shown to substantially reduce the diffraction response which manifests itself as low PDL.

Figure 5:
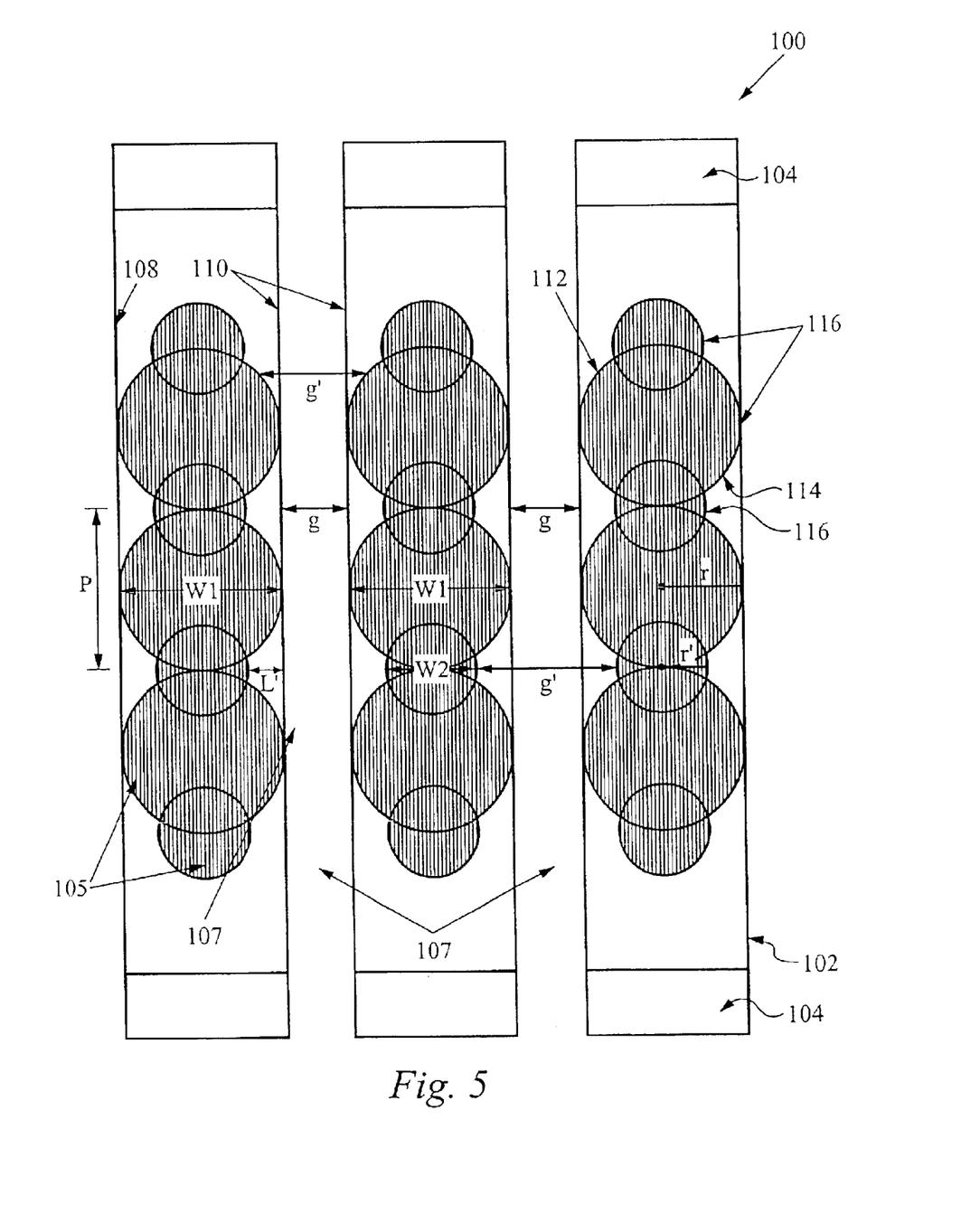
FIG. 5 illustrates a first embodiment of a plurality of elements included within a diffractive light modulator.

FIG. 5 illustrates a first embodiment of a plurality of elements included within a diffractive light modulator. Preferably, the diffractive light modulator comprises a grating light valve™ light modulator 100. Preferably, each element within the grating light valve™ light modulator 100 is a ribbon 102. Each ribbon 102 includes a first end supported by a post 104, a second end supported by another post 104, and a reflective surface 105 as its topmost layer. Preferably, the reflective surface 105 is also conducting. The posts 104 support the ribbons 102 to maintain the position of each ribbon 102 relative to each other. The posts 104 are preferably coupled to a substrate. The support posts 104 also enable the movement of selected ones of the ribbons 102 in a direction normal to a substrate of the grating light valve™ light modulator 100, discussed in greater detail below. Although each ribbon 102 is preferably supported at its ends by a post, it is understood that any means for supporting the ribbons to maintain the position of each ribbon 102 relative to each other and to enable movement in a direction normal to the substrate of the grating light valve™ light modulator 100 can be used.

It will be readily apparent to one skilled in the art that the conducting and reflecting layer can be replaced by a multi-layer dielectric reflector in which case a conducting element would also be included in each of the elongated elements. Further, it will be readily apparent to one skilled in the art that the conducting and reflecting layer can be coated with a transparent layer such as an anti-reflective layer.

Preferably, each of the plurality of ribbons are arranged in parallel. Each ribbon 102 is separated from an adjacent ribbon 102 by a gap 107 of g width. Preferably, the gap 107 of g width is constant and symmetrical. However, a variable effective gap g' is produced by etching a portion of the reflective surface 105 from the ribbon 102. The ribbon 102 portion having no reflective surface 105 acts as the gap 107 of g width when an incident light I is applied.

Each ribbon 102 includes a first linear side 108 and a second linear side 110. Each reflective surface 105 includes a first non-linear side 112 and a second non-linear side 114 where each non-linear side includes one or more projections. As illustrated in FIG. 5, the projections in the first embodiment are arcs of varying radius. Specifically, the non-linear sides of each ribbon 102 include arc-shaped projections 116. Preferably, every other arc is of equal radius, here depicted as r and r'. The arc projections 116 preferably repeat every period P. In this manner, the arc projections 116 form a recurring pattern with period P. As can be seen in FIG. 5, the recurring pattern on the first non-linear side 112 is in-phase with the recurring pattern on the second non-linear side 114. However, it is not necessary that these sides be in-phase. An alternative embodiment may have a first non-linear side 112 and a second non-linear side 114 out of phase as well.

Each ribbon 102 includes the ribbon width W. For any given ribbon, an effective width is defined as the width of the reflective surface 105 at the point where an incident light impinges the ribbon. The effective width can be defined as the ribbon width W minus the amount of reflective surface etched away at that point. The effective width can also be defined as the reflective surface 105 width in an active area of the ribbon 102. The active area is a portion of the ribbon 102 in which the incident light impinges. In the first embodiment, the amount of reflective surface 105 etched at any given point along the length of the ribbon is a variable width L'. Therefore, a first effective width W1 is larger than a second effective width W2. As can be seen in FIG. 5, the effective width of each ribbon 102 at any given point along the ribbon 102 is essentially the same. Specifically, the effective width WI is equal to a first effective width W1 of an adjacent ribbon 102.

It should be understood that in the embodiment set out in FIG. 5, the recurring pattern of the reflective surface 105 may extend to the ends of the ribbons 102, to the support structure 104 or may only be etched as such in an active area. Regardless of how far the recurring pattern extends, at least a portion of the reflective surface extends to the support structure 104. Further, the recurring pattern of the non-linear sides 112 & 116 of the reflective surface 105 may be of a larger, smaller or varying period.

The grating light valve™ light modulator 100 is operated in a similar manner as a conventional grating light valve™ light modulator. In a reflection mode, the reflecting layers of the ribbons 102 form a plane so that incident light I reflects from the ribbons 102 to produce reflected light R. The reflected light R is reflected in the zero order.

In a diffraction mode, an electrical bias causes alternate ones of the ribbons 102 to move toward the substrate of the grating light valve™ light modulator 100. The electrical bias is applied between the reflecting and conducting layers of the alternate ones of the ribbons 102 and a conductor on the substrate. The electrical bias results in a height difference between the alternate ones of the ribbons 102 and non-biased ones of the ribbons 102. A height difference of a quarter wavelength $\lambda/4$ of the incident light I produces maximum diffracted light including plus one and minus one diffraction orders, $D_{+1}$ and $D_{-1}$. For a deflection of the alternate ones of the ribbons 102 of less than a quarter wavelength $\lambda/4$, the incident light I both reflects and diffracts producing the reflected light R and the diffracted light including the plus one and minus one diffraction orders, $D_{+1}$ and $D_{-1}$. In other words, by deflecting the alternate ones of the ribbons 102 less the quarter wavelength $\lambda/4$, the diffractive light modulator 100 produces a variable reflectivity.

Figure 6:
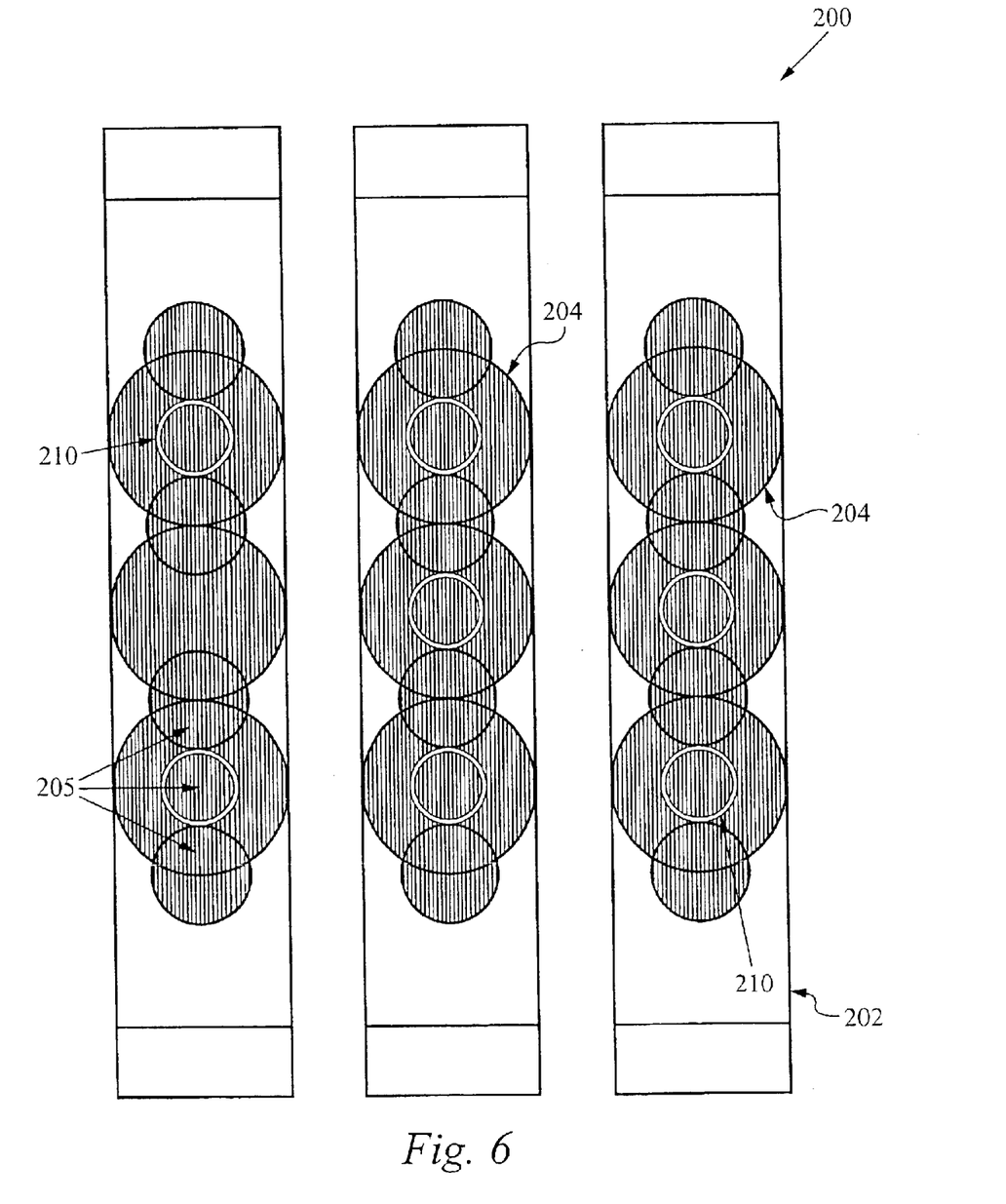
FIG. 6 illustrates a second embodiment of a plurality of elements included within a diffractive light modulator.
Figure 10:
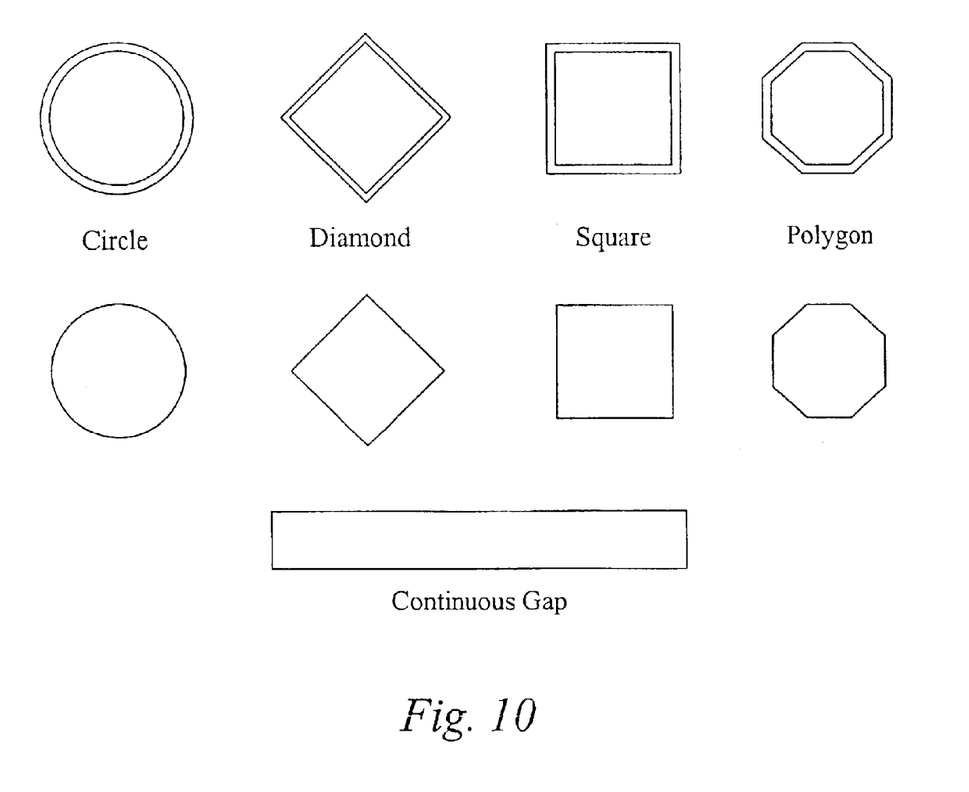
FIG. 10 illustrates examples of gap patterns that can be placed into the reflective surface.

FIG. 6 illustrates a second and preferred embodiment of a plurality of elements included within a diffractive light modulator 200. The second embodiment differs from the first embodiment in that the reflective surface 205 is non-continuous. In other words, gaps 210 are etched into the reflective surface 205. The gaps 210 pictured in FIG. 6 are circular shaped rings placed in a period equal to that of the arc-shaped projections of the non-linear sides 204 of the ribbons 202. It is understood that the gaps 210 may be of any shape and size. FIG. 10 depicts a sample of possible shapes that the gaps 210 may take. Also depicted in FIG. 10, the gaps 210 are preferably in a "ring" design so to surround an area of reflective surface 205. However, FIG. 10 also depicts the gaps 210 not in the "ring" design, rather in a solid shape so as to have no reflective surface 205 at all. Referring back to FIG. 6, the gaps 210 are placed in a period equal to that of the arc-shaped projections. It is understood that the gaps 210 may be in a period as pictured, independent of the non-linear sides 204, or not in a period at all. Also, the placement of the gaps 210 may be centered with respect to the ribbon 202, completely random or following some other pattern. However, the second embodiment does not provide as high contrast as the first embodiment. Higher contrast is achieved when the reflective surface is continuous and further higher contrasts are achieved when the reflective surface 205 area is high. The first embodiment has a higher contrast than the second embodiment due to the lack of gaps 210 in the first embodiment. However, the configuration shown in FIG. 6 including the gaps 210 display a superior PDL reduction.

Figure 7:
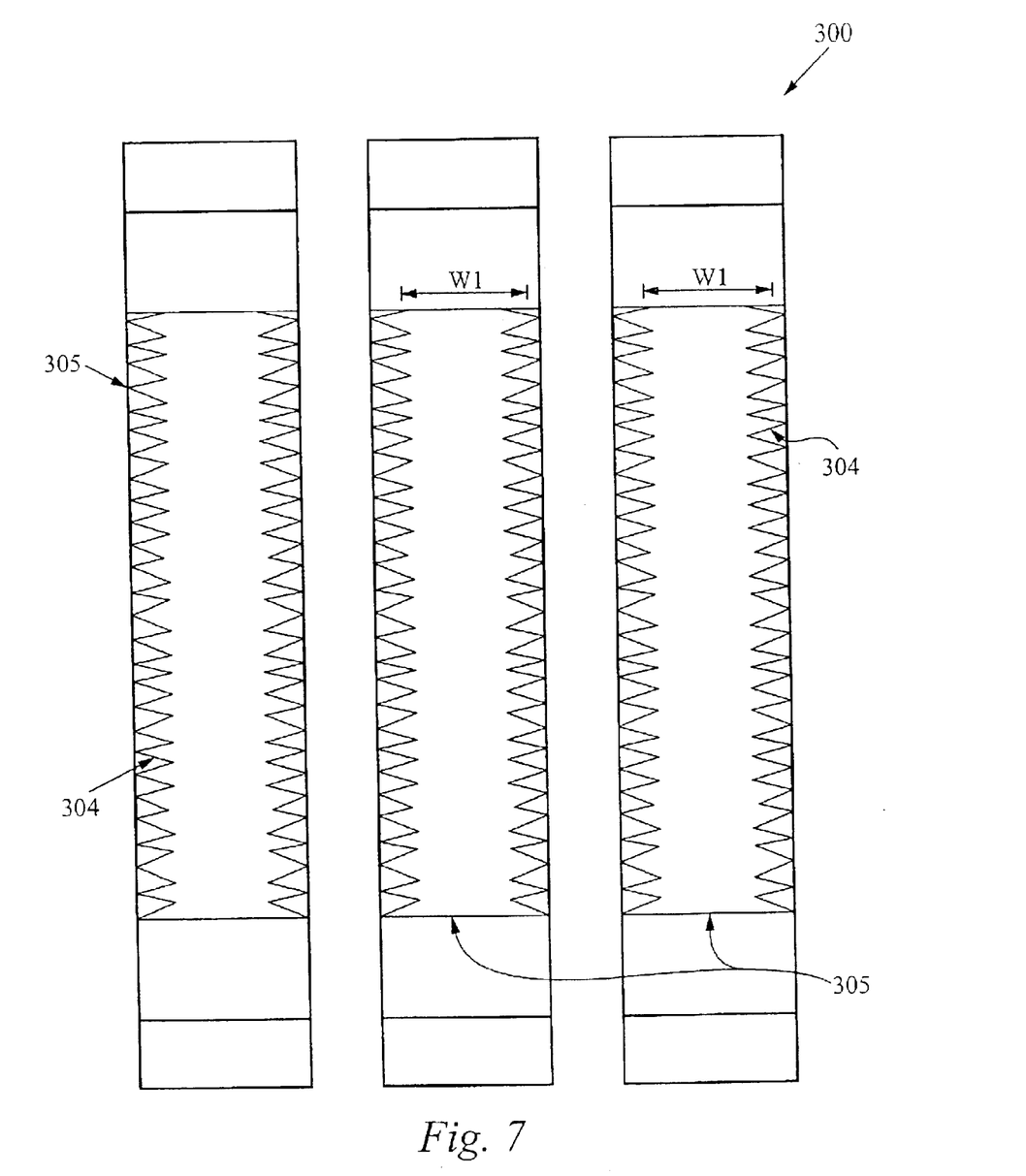
FIG. 7 illustrates a third embodiment of a plurality of elements included within a diffractive light modulator.

FIG. 7 illustrates a third embodiment of a plurality of elements included within an active area of a diffractive light modulator 300. The third embodiment is similar to the first embodiment except that the recurring pattern on each non-linear side 304 of the reflective surface 305 is a series of random projections having no period or symmetry. Specifically, the non-linear sides 304 of each reflective surface 305 of each ribbon 302 in the third embodiment is a jagged edge. Therefore, conversely to the first embodiment, the effective widths W1 of adjacent ribbons 302 are not equal. However, due to the high reflective surface 305 area, the third embodiment of the grating light valve™ light modulator 300 provides high contrast operation. Of course, this embodiment is not limited to random projections, but can also have a "jagged edge" with projections that are symmetrical on each non-linear side 304 of the reflective surface 305, and further wherein the projections are of equal shape and size. It is understood that this embodiment, and embodiments having other projection shapes, sizes and patterns may include the gaps 210 as depicted in the second embodiment in FIG. 6. Again, the gaps 210 may take on, but are not limited to, any of the shapes depicted in FIG. 10.

Generally, PDL produced by the arc-shaped projections is less than the PDL produced by other projections. This is because of the smoothly varying nature of the edge of the circle. Other shapes, such as the square or the jagged edge is not smoothly varying at the corners, where there are abrupt changes in direction. Such abrupt changes lead to increases in PDL when compared to PDL produced at the smoothly varying edge of the circle. However, the more smoothly varying the non-linear side of the reflective surface, the less distinct is the diffraction of the incident light. As such, for a smoothly varying non-linear side it is more difficult to de-couple the diffracted light from the reflected light in the zero order. Since all of the diffracted light can not be decoupled in this case, the contrast is reduced. This concept can be better understood by looking at the operation of the grating light valve™ light modulator.

In operation, the zero order light is collected. When in the reflection mode, all of the incident light is reflected back as zero order light. In the diffraction mode, alternating ones of the ribbons are deflected to a maximum diffraction distance of a quarter wavelength λ/4 of the incident light. In an optimal case, all of the incident light will diffract into the first order while in the diffraction mode. In practice, a portion of the incident light scatters. In other words, a portion of the incident light diffracts at an angle different than that of the first order. Some of the light that is scattered can be close enough to the zero order such that this scattered light is collected in addition to any zero order light. Non zero-order light may be collected because the portion of the scattered light close enough to the zero order can not be decoupled from the zero order light. As more of the scattered light is collected, contrast is reduced.

As the ribbons are deflected towards λ/4, the incident light reflected in the zero order is reduced and the diffracted light increases. For a non-linear side with a recurring pattern of square projections, the highest contrast is achieved at the maximum diffraction λ/4. This is because the square projections diffract a significant percentage of the incident light into the first order and less of the incident light is scattered elsewhere. However, for a non-linear side with a recurring pattern of alternating half-circles, the highest contrast is achieved at a deflection less than λ/4. The arc-shaped projections diffract a lower percentage of the incident light into the first order and more light is scattered at an angle that can not be decoupled from the zero order. Therefore, as the ribbons are deflected and the zero order light is reduced, the diffracted light increases including the scattered light that can not be decoupled from the zero order light. There reaches a deflection point short of λ/4 where the amount of light that is collected can no longer be reduced. Even though the incident light reflected back as zero order light continues to decrease as the deflection of the ribbons increase, the amount of scattered light that is collected is simultaneously increasing. Therefore, the maximum contrast achieved by the arc-shaped projections is not as high as the maximum contrast achieved by square projections. Recalling that PDL produced by the arc-shaped projections is less than the PDL produced by the square projections, there exists a trade-off between PDL and contrast.

For projections other than arc-shaped, the scattered light is not as close to the zero order light. As a result, the contrast for other projections is higher than that for arcs. It should be clear to those skilled in the art that the arc-shaped projections illustrated in FIGS. 5 and 6 can include a radius either smaller or larger than that shown.

Figure 8:
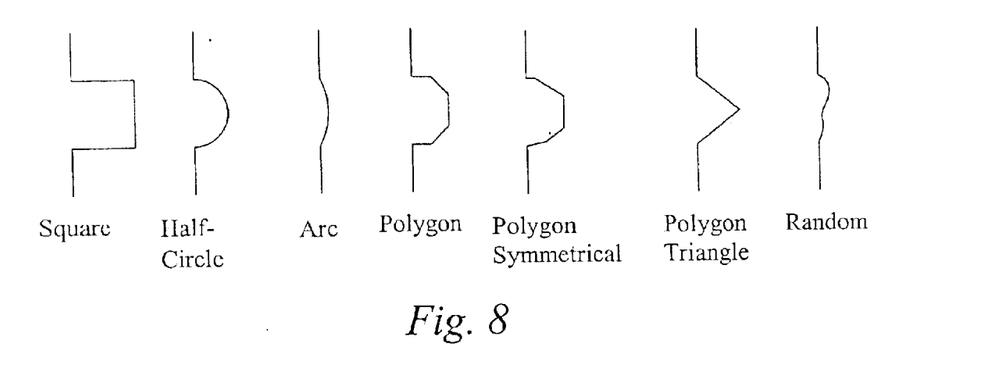
FIG. 8 illustrates examples of projection shapes that can be included on the non-linear sides of the reflective surfaces.

It is understood that the embodiments illustrated in FIGS. 5–7 are intended to aid in understanding and should not be used to limit the scope of the present invention. The gap width g, the effective gap width g', the ribbon width W, the dimensions, including shape and size of the projections and the frequency of the projections illustrated in FIGS. 5–7 can be increased or decreased as appropriate. Likewise, all embodiments may contain gaps as depicted in FIG. 6 and further in FIG. 10. FIG. 10 illustrates examples of gap shape that can be included on any embodiment of the present invention. Furthermore, the shapes of the projections are not limited to arcs and jagged edges. FIG. 8 illustrates examples of projection shapes that can be included on the non-linear sides of the reflective surfaces. Projection shapes can include, but are not limited to, a square, a half-circle, an arc, a polygon including a symmetrical polygon and a triangle, or any randomly shaped projection.

It is similarly understood that the gaps shown in FIG. 6 are not limiting to the embodiments of this invention. FIG. 10 illustrates examples of gaps that can be included in any embodiment, with any period and at any location in the reflective surface. The shape of any gap is in no way limited by FIG. 10. However, it is understood that symmetrically placed gaps are found to provide the ribbon with the least amount of mechanical or lateral stress, thus increasing the mechanical stability of the ribbon.

Additionally, it should be noted that the Continuous Gap shown in FIG. 10 can be implemented in any embodiment to span the entire width of the reflective surface. Such a gap, placed periodically and symmetrically on every ribbon renders the effective gap width g' at the point which the gap lies on the ribbon as infinite. In other words, a continuous gap in every ribbon may span the width of the diffractive light modulator. Traditionally, this embodiment has not shown the strongest PDL reduction relative to the other embodiments.

Figure 9:
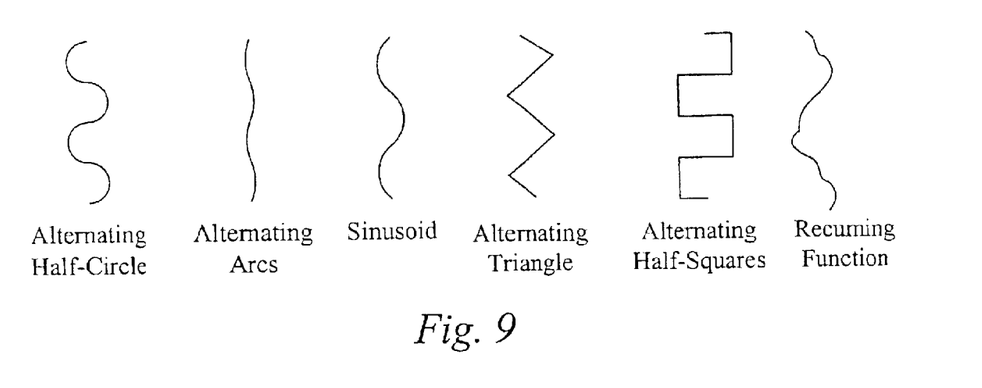
FIG. 9 illustrates examples of recurring patterns that can be included on the non-linear sides of the reflective surfaces.

Similarly, the recurring patterns formed by the non-linear sides of the reflective surfaces are not limited to alternating halves of a circle or alternating halves of a square. FIG. 9 illustrates examples of recurring patterns that can be included on the non-linear sides of the reflective surfaces. Recurring patterns can include, but are not limited to, alternating half-circles, alternating arcs, a sinusoid, alternating triangles, alternating squares, or any other recurring function. Arcs can also be considered as sectors of a circle, where a recurring pattern that alternates between a sector of a circle and a mirror image of the sector has a decreased amplitude as compared to a recurring pattern that alternates half-circles of the circle.

As explained in the first embodiment, it is understood that in any and all embodiments, the reflective surface may extend to the ends of the ribbons, to the support structure or may only be etched as such in an active area. Further, the recurring pattern of the non-linear sides of the reflective surface may be of a larger, smaller or varying period, and in no way should FIGS. 5–7 limit the dimensions of the reflective surface and its proximity to the support structure or end of the ribbon.

It will be readily apparent to one skilled in the art that other various modifications may be made to the embodiments without departing from the spirit and scope of the invention as defined by the appended claims.

We claim:

1. A modulator for modulating an incident beam of light comprising:
   a. a plurality of elements, each element including a first end, a second end, a first linear side, a second linear side, and a light reflective planar surface with the light reflective planar surfaces of the plurality of elements lying in one or more parallel planes, wherein the plurality of elements are arranged parallel to each other and further wherein the light reflective planar surface of each of the plurality of elements includes a first non-linear side and a second non-linear side; and
   b. a support structure coupled to each end of the plurality of elements to maintain a position of each element relative to each other and to enable movement of selective ones of the plurality of elements in a direction normal to the one or more parallel planes of the plurality of elements, and between a first modulator configuration wherein the plurality of elements act to reflect the incident beam of light as a plane mirror, and a second modulator configuration wherein the plurality of elements act to diffract the incident beam of light.

2. The modulator according to claim 1 wherein the first non-linear side and the second non-linear side each include one or more projections, wherein each projection is perpendicular to each of the linear sides of the element.

3. The modulator according to claim 2 wherein the one or more projections do not extend beyond the first linear side and the second linear side.

4. The modulator according to claim 3 wherein each projection on the first non-linear side is repeated according to a constant period, and each projection on the second non-linear side is repeated according to a constant period.

5. The modulator according to claim 4 wherein the shape of each projection is the same.

6. The modulator according to claim 5 wherein the projections on the first non-linear side are symmetric in relation to the projections on the second non-linear side.

7. The modulator according to claim 6 wherein the non-linear sides of adjacent elements are symmetrical.

8. The modulator according to claim 1 wherein the modulator is a diffractive MEMS device.

9. The modulator according to claim 1 wherein the selective ones of the elements are alternating elements and are moved by applying an electrostatic force.

10. A modulator for modulating an incident beam of light comprising:
    a. a plurality of elements, each element including a first end, a second end, a first linear side, a second linear side, and a non-continuous light reflective planar surface with the non-continuous light reflective planar surfaces of the plurality of elements lying in one or more parallel planes, wherein the elements are arranged parallel to each other and further wherein the non-continuous light reflective planar surface of each of the plurality of elements includes a first non-linear side and a second non-linear side; and
    b. a support structure coupled to each end of the plurality of elements to maintain a position of each element relative to each other and to enable movement of selective ones of the plurality of elements in a direction normal to the one or more parallel planes of the plurality of elements, and between a first modulator configuration wherein the plurality of elements act to reflect the incident beam of light as a plane mirror, and a second modulator configuration wherein the plurality of elements act to diffract the incident beam of light.

11. The modulator according to claim 10 wherein the first non-linear side and the second non-linear side each include one or more projections, wherein each projection is perpendicular to each of the linear sides of the element.

12. The modulator according to claim 11 wherein the one or more projections do not extend beyond the first linear side and the second linear side.

13. The modulator according to claim 12 wherein each projection on the first non-linear side is repeated according to a constant period, and each projection on the second non-linear side is repeated according to a constant period.

14. The modulator according to claim 13 wherein the shape of each projection is the same.

15. The modulator according to claim 14 wherein the projections on the first non-linear side are symmetric in relation to the projections on the second non-linear side.

16. The modulator according to claim 15 wherein the non-linear sides of adjacent elements are symmetrical.

17. The modulator according to claim 10 wherein the modulator is a diffractive MEMS device.

18. The modulator according to claim 10 wherein the selective ones of the elements are alternating elements and are moved by applying an electrostatic force.

19. The modulator according to claim 10 wherein the non-continuous portion of each of the light reflective planar surfaces is non-reflective.

20. A modulator for modulating an incident beam of light comprising:
    a. means for supporting each of a plurality of elements to maintain a position of each element relative to each other and to enable movement of selective ones of the plurality of elements in a direction normal to the one or more parallel planes of the plurality of elements, wherein each element includes a first end, a second end, a first linear side, a second linear side, and a light reflective planar surface with the light reflective planar surfaces of the plurality of elements lying in one or more parallel planes, and the elements are arranged parallel to each other and further wherein the light reflective planar surfaces of each of the plurality of elements includes a first non-linear side and a second non-linear side; and
    b. means for moving selective ones of the plurality of elements between a first modulator configuration wherein the plurality of elements act to reflect the incident beam of light as a plane mirror, and a second modulator configuration wherein the plurality of elements act to diffract the incident beam of light.

* * * * *